(12) United States Patent
Bojarski et al.

(10) Patent No.: US 10,381,950 B2
(45) Date of Patent: Aug. 13, 2019

(54) RESONANT INVERTER TOPOLOGY, WIRELESS CHARGER, AND CONTROL METHOD

(71) Applicant: NEW YORK UNIVERSITY, New York, NY (US)

(72) Inventors: Mariusz Bojarski, Bronx, NY (US); Dariusz Czarkowski, S. Setauket, NY (US); Francisco De Leon, Ridgewood, NJ (US)

(73) Assignee: New York University, New York, NY (US)

( * ) Notice: Subject to any disclaimer, the term of this patent is extended or adjusted under 35 U.S.C. 154(b) by 385 days.

(21) Appl. No.: 15/113,765

(22) PCT Filed: Feb. 18, 2015

(86) PCT No.: PCT/US2015/016383
§ 371 (c)(1),
(2) Date: Jul. 22, 2016

(87) PCT Pub. No.: WO2015/126946
PCT Pub. Date: Aug. 27, 2015

(65) Prior Publication Data
US 2017/0008405 A1    Jan. 12, 2017

Related U.S. Application Data

(60) Provisional application No. 61/941,637, filed on Feb. 19, 2014.

(51) Int. Cl.
*H02M 7/537* (2006.01)
*H02M 7/48* (2007.01)
(Continued)

(52) U.S. Cl.
CPC ............. *H02M 7/537* (2013.01); *B60L 53/12* (2019.02); *B60L 53/30* (2019.02); *H02J 7/025* (2013.01);
(Continued)

(58) Field of Classification Search
CPC .......... H02M 7/44; H02M 7/493; H02M 7/53; H02M 7/5387; H02M 2007/4815; H02M 2007/4822; B60L 2230/10; Y02B 70/1441
See application file for complete search history.

(56) References Cited

U.S. PATENT DOCUMENTS 8,964,432 B2 * 2/2015 Tang ................... H02M 7/48
363/71
9,960,699 B2 * 5/2018 Hsieh ................. H02M 5/4585
(Continued)

OTHER PUBLICATIONS

Cougo, F. Design and Optimization of InterCell Transformers forParallel Multicell Converters, PhD, Institut National Polytechnique de Toulouse, 2010. Retrieved on May 2, 2015. Retrieved from Internet URL:http://oatao.univ-toulouse.fr.7037/1/cougo.pdf> entire document, especially p. 12-32.
(Continued)

*Primary Examiner* — Kyle J Moody
(74) *Attorney, Agent, or Firm* — Kilpatrick Townsend & Stockton LLP

(57) ABSTRACT

A wireless charger for an electric vehicle and a resonant inverter comprising a resonant portion that serially connects to a phase shifting portion and serially connects with a load component and a method for controlling a resonant inverter having multiple phase shifts, comprising operating the frequency of the resonant inverter close to the resonant frequency of the inverter through the full operation range of the resonant inverter; and adjusting phase shifts to control the output power of the resonant inverter.

20 Claims, 24 Drawing Sheets

(51) Int. Cl.

| | | |
|---|---|---|
| *H02M 7/46* | (2006.01) | |
| *H02J 7/02* | (2016.01) | |
| *H02J 50/12* | (2016.01) | |
| *B60L 53/12* | (2019.01) | |
| *B60L 53/30* | (2019.01) | |
| *H02M 1/00* | (2006.01) | |

(52) U.S. Cl.
CPC ............... *H02J 50/12* (2016.02); *H02M 7/46* (2013.01); *H02M 7/48* (2013.01); *H02M 2001/0058* (2013.01); *H02M 2007/4815* (2013.01); *Y02B 70/1441* (2013.01); *Y02T 90/127* (2013.01)

(56) References Cited

U.S. PATENT DOCUMENTS

| | | |
|---|---|---|
| 2001/0054881 A1 | 12/2001 | Watanabe |
| 2003/0231008 A1 | 12/2003 | Wu |
| 2004/0218406 A1 | 11/2004 | Jang et al. |
| 2008/0130323 A1 | 6/2008 | Wagner et al. |
| 2011/0285210 A1 | 11/2011 | Lemmens et al. |
| 2012/0039092 A1 | 2/2012 | Xu et al. |
| 2012/0069606 A1 | 3/2012 | Sagneri et al. |

OTHER PUBLICATIONS

International Search Report and Written Opinion dated Jun. 17, 2015 in corresponding International Application No. PCT/US2015/016383.

\* cited by examiner

RESONANT INVERTER TOPOLOGY, WIRELESS CHARGER, AND CONTROL METHOD

This application is filed pursuant to 35 U.S.C. § 371 based on International Application No. PCT/US2015/016383, filed Feb. 18, 2015, which claims priority to U.S. Provisional Application No. 61/941,637, filed on Feb. 19, 2014, the entirety of which is incorporated hereby by reference.

BACKGROUND

1. Field of the Invention

This invention relates generally to a method and topology for a resonant inverter. Specifically, the resonant inverter is capable of being incorporated in a charger that wirelessly charges the energy storage device of an electric vehicle or an electronic device.

2. Background Discussion

There are growing interests in wireless charging batteries of electronic devices, such as phones and electric vehicles. For the proliferation of electric vehicles, especially in the urban environment, it is desirable that charging instruments are accessible as widely as possible. While it may be a routine for an electric vehicle to go to a dedicated charging station to obtain energy, it would be more convenient if an electric vehicle may be charged while parking or even waiting for traffic signals. Technologies related to a wireless power transfer have been under development for many years to solve the charging demand of electronic devices. Two wireless power transfer technologies for charging electric vehicles have been under research: one is inductive charging, and the other is charging via magnetic resonance.

Inductive charging has already been known and well described in many patents and publications. The inductive charging technology has, however, a significant disadvantage. It works well only at a very short distance between a transmitter and a receiver, which requires precise device positioning and complicated mechanical solutions, which is probably a main reason why there is not much interest in the inductive charging technology in the wireless-charging market of electric vehicles.

The magnetic resonance technology utilizes inductors connected with capacitors in a resonant circuit which allows for compensating a large leakage inductance of the coupled inductors. It allows for operating with significant air gaps between transmitting and receiving windings. In other words, the transmitter and receiver form a coreless connection. Magnetic resonance utilizes inductors tuned for the same resonant frequency to facilitate wireless power transfer. From an electrical point of view, the technology is based on a well-known technique for compensation of a leakage inductance of a transformer. The transmitted power and efficiency change significantly with operating frequency and circuit parameters due to the use of resonant circuits. That is why magnetic resonance technology requires dedicated power electronics solutions like specialized resonant inverters.

In general, resonant inverters convert a direct current to an alternating current by using a resonant circuit. Conventional control methods for resonant converters use either frequency or phase to adjust the output of the circuit. Optimization of the design of the inverter for this particular technology and application can help to achieve outstanding performance.

Frequency control is a popular method and can be implemented for a wide variety of resonant converter topologies. Many of the techniques are described and analyzed in Reference [1]. Frequency control, regardless of its simplicity has some disadvantages. It requires a wide range of operating frequency to regulate output and a very high switching frequency at light loads. Compared with frequency control, phase control can avoid those problems associated with frequency control. Phase control typically operates at a constant frequency and can obtain a zero-voltage-switching (ZVS) condition over an entire regulation range. Such inverters with different resonant circuits are described and analyzed in References [2]-[4]. One can see that these inverters consist of two half-bridges connected in parallel. Generalization of this concept leads to paralleling multiple phases, which is presented in Reference [5].

Other approaches to improve the performance of multiphase resonant converters include connecting them in parallel downstream of the rectifier. This approach gives several new control and ripple reduction possibilities. Such approach is shown and analyzed in References [6]-[12].

SUMMARY

In summary, the present disclosure discloses a topology of resonant inverters that have multiple identical or substantially identical half-bridge or full-bridge inverter units. These inverter units are paralleled by using intercell transformers to form a multiphase resonant inverter connected to the common resonant circuit that is capable of being controlled by a phase method, a frequency method, or a hybrid method involving both frequency and phase controls. Inverters can operate at a constant frequency utilizing phase-shift control to regulate the output. A novel hybrid phase-frequency control method for these resonant inverters is described in the present disclosure. Both symmetrical and asymmetrical phase control methods are presented. A three phase resonant inverter with a common resonant circuit has been constructed and tested to demonstrate the advantages of the topology and the hybrid control method.

Compared to conventional control methods, the inverter topology and hybrid control method described in the present disclosure represent an advantageous inverter with multiphase parallel structure and a single resonant circuit. Other topologies having intercell transformers which are used for paralleling half-bridges are presented in [13], the entirety of which is incorporated herein by reference.

The structure and new control strategies as set forth in the present disclosure are suitable for applications in wireless power transfer. Many applications require high power on a single resonant circuit operating close to the resonant frequency. The inverter circuit presented in the present disclosure with proposed control strategies is capable of meeting these requirements demanded by wireless power transfer applications.

According to an aspect, the present disclosure is directed to a multiphase resonant inverter comprising an inverter portion connected to an intercell transformer portion which serially connects a resonant portion with a load component.

According to various embodiments, the inverter portion includes a plurality of half-bridge switching legs, each having the same frequency and independent phase shift; the intercell transformer portion includes a plurality of intercell transformers, each intercell transformer directly connects with at least two other intercell transformers. The resonant portion includes L and C components.

According to an aspect, the present application is directed to a resonant inverter comprising an inverter portion connected to an intercell transformer portion and a common resonant portion having a load component.

According to some embodiments, the intercell transformer portion includes a plurality of intercell transformers connected with each other in an interweaving manner, such as three intercell transformers. Each intercell transformer directly connects with at least two other intercell transformers. The plurality of intercell transformers are identical or substantially identical to each other.

According to some embodiments, the resonant portion includes L and C components connected in serial, parallel or serial-parallel configurations. The resonant portion connects with the intercell transformer portion in a serial manner.

According to some embodiments, the inverter portion includes a plurality of half-bridge inverters or full-bridge inverters. The plurality of inverters are connected in a parallel manner via the intercell transformer portion.

According to an embodiment, the resonant inverter includes a DC power source.

According to an embodiment, the resonant inverter is capable of being operated close to the resonant frequency across a wide range of output power.

According to another aspect, the present disclosure is directed to a method for controlling a resonant inverter with multiple phase shifts, comprising operating the frequency of the resonant inverter close to the resonant frequency of the inverter through the full operation range of the resonant inverter; and adjusting the phase shifts to control the output power of the resonant inverter.

According to some embodiments, each of the multiple phase shifts is identical or substantially identical to each other. In some embodiments, the multiple phase shifts include at least two different phase shifts.

According to some embodiments, the method adjusts each phase shift equally or independently. The method determines a range of phase shifts based on the voltage transfer function of the resonant inverter and determines a control trajectory of phase shifts that causes the principle argument of the resonant inverter to be greater than zero.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

It is noted that in this disclosure, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. Embodiments of the present invention are disclosed or are apparent from and encompassed by, the following description.

Resonant Inverter Topology and Analysis

Figure 1A:
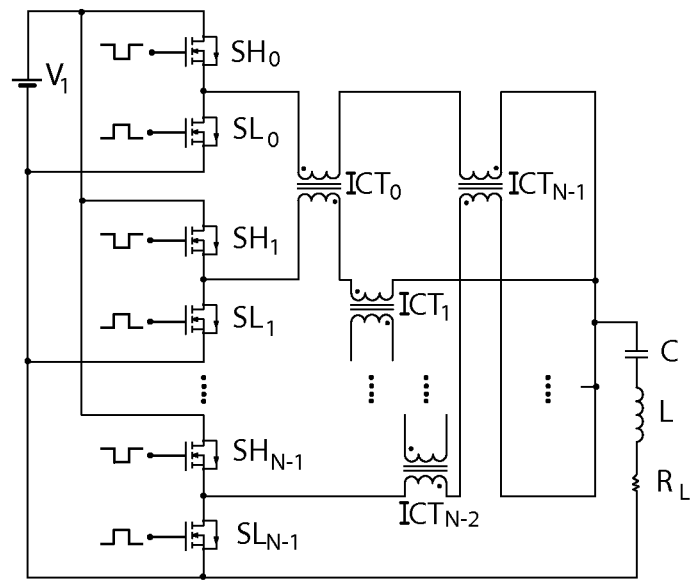
FIG. 1(a) shows an inverter circuit having multiple intercell transformers according to an embodiment of the present disclosure.
Figure 1B:
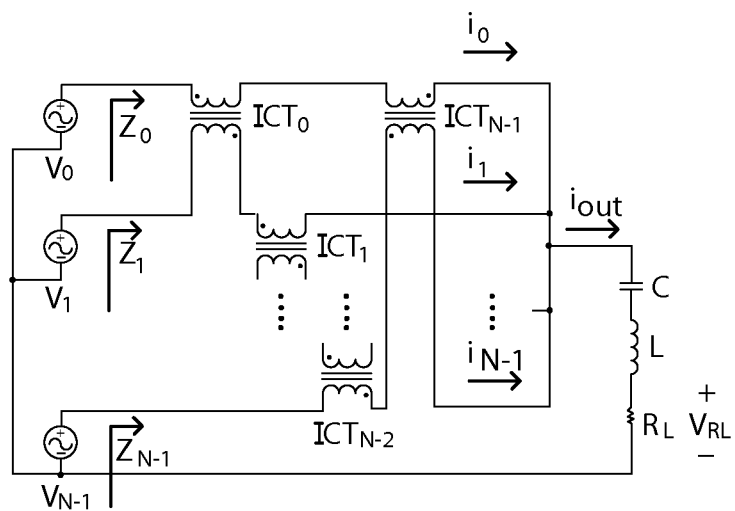
FIG. 1(b) shows an equivalent circuit for the fundamental components of the inverter circuit as shown in FIG. 1(a) according to an embodiment of the present disclosure.

FIG. 1(a) shows an inverter circuit having multiple intercell transformers according to an embodiment of the present disclosure. FIG. 1(b) shows an equivalent circuit for the fundamental components of the inverter circuit as shown in FIG. 1(a) according to an embodiment of the present disclosure. The inverter circuit as shown in FIG. 1(a) includes a power source, such as a DC input voltage source $V_I$, N switching portions (phases), a resonant inductor L, resonant capacitor C, N intercell transformers ICT, and an AC load $R_L$. According to an embodiment, the power source may be an alternating current or voltage input; and preferably is a DC source. According to an embodiment, each switching portion may be a half-bridge formed by two transistors SH and SL, where SH represents a switch that provides a high voltage output, and SL represents a switch that provides a low voltage output. SH and SL may be turned on and off alternately, thus providing a square wave output. A resonant inverter of three intercell transformers that embodies the features of the circuit shown in FIG. 1(a) has been built and shown in FIG. 13.

According to an embodiment, each intercell transformer has two windings which are connected as shown in FIG. 1(a). The terminals of the N intercell transformers are connected in an interweaving manner. The plurality of intercell transformers form a phase control portion that is capable of separately adjusting the phase of the voltage or current output $i_0, i_1, \ldots i_{N-1}$ of each switching leg as shown in FIG. 1(b).

Figure 1C:
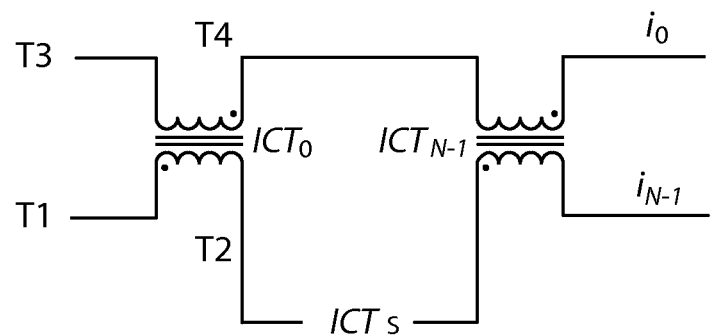
FIG. 1(c) shows a topology of N intercell transformers according to an embodiment of the present disclosure.

FIG. 1(c) shows a topology of N intercell transformer according to an embodiment of the present disclosure. The embodiment of the topology of N intercell transformers of FIG. 1(c) may be divided into three portions: $ICT_0$, $ICT_{N-1}$, and the other ICTs. $ICT_0$ may be conceptually understood as the beginning transformer, while $ICT_{N-1}$ may be conceptually understood as the ending transformer. All the other transformers ICTs are disposed between the starting transformer and the ending transformer. Each transformer has four terminals: T1 for the input terminal of the primary winding, T2 for the output terminal of the primary winding, T3 for the input terminal of the secondary winding, and T4 for the output terminal of the secondary winding. For the beginning transformer $ICT_0$, input terminals T1 and T3 for both the primary and secondary windings are connected with a power source, such as a DC power source (not shown in FIG. 1(c)). The beginning transformer $ICT_0$ and the ending transformer $ICT_{N-1}$ are connected in a serial manner. For example, the out terminal T4 of the secondary winding of the beginning transformer $ICT_0$ connects with the input terminal of the secondary winding of the ending transformer $ICT_{N-1}$, while the output terminal T2 of the primary winding of the beginning transformer $ICT_0$ and the input terminal of the primary winding of the ending transformer $ICT_{N-1}$ are connected via the intermediate transformers ICTs. The output terminals of both the secondary winding and the primary winding of the ending transformer $ICT_{N-1}$ output current $i_0$ and $i_{N-1}$ directly to a resonant portion (not shown in FIG. 1(c)).

Each of the intermediate transformer ICTs connects with other transformers according to the following rules:

1. T1: The input terminal T1 of the primary winding of each of the intermediate transformers is connected with the power source.
2. T4: The output terminal T4 of the secondary winding of each of the intermediate transformers outputs current i directly to the resonant portion.
3. T3: The input terminal T3 of the secondary winding of each of the intermediate transformers is connected with the output terminal of the primary winding of the transformer that is immediately before that transformer.
4. T2: If a transformer is not the N-2 transformer, which means the transformer does not connect directly to the ending transformer $ICT_{N-1}$, the output terminal T2 of the primary winding of the transformer is connected to an input terminal of the secondary winding of the next transformer. If a transformer is the N-2 transformer, which means that the transformer connects with the ending transformer $ICT_{N-1}$ directly, then the output terminal T2 of the primary winding of the transformer is connected to the input terminal of the primary winding of the ending transformer $ICT_{N-1}$.

Figure 1D:
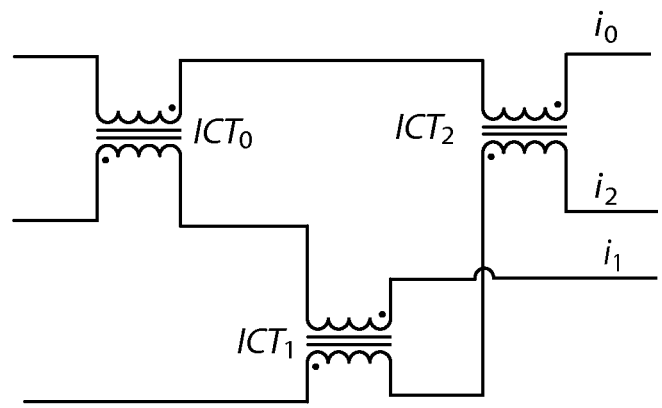
FIG. 1(d) shows a topology of three intercell transformers according to an embodiment of the present disclosure.

FIG. 1(d) shows the connection of three transformers according to the topology in FIG. 1(c). In FIG. 1(d), $ICT_1$ is the only transformer that is between $ICT_0$ and $ICT_{N-1}$. According to the rules, the input terminal of the primary winding of $ICT_1$ is connected to a power line, while the output terminal of the secondary winding outputs current $i_1$ directly to a resonant portion. The input terminal of the secondary winding of $ICT_1$ is connected with the output terminal of the primary winding of the beginning transformer $ICT_0$. The output terminal of the primary winding of $ICT_1$ is connected to the input terminal of the primary winding of the ending transformer $ICT_2$ because $ICT_1$ connects with the ending transformer $ICT_2$ directly.

Figure 1E:
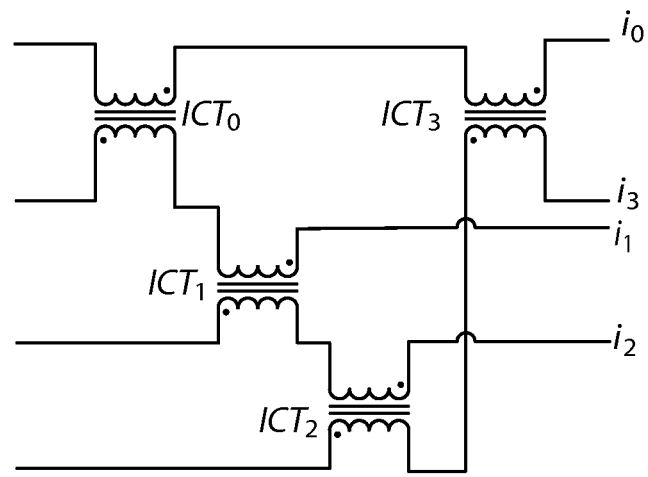
FIG. 1(e) shows a topology of four intercell transformers according to an embodiment of the present disclosure.

FIG. 1(e) shows the connection of four transformers following the topology in FIG. 1(c). In FIG. 1(e), $ICT_0$ and $ICT_3$ are the beginning transformer and the ending transformer, respectively. $ICT_2$ is the transformer that connects with the ending transformer $ICT_3$ directly. It is noted that the output terminal of the primary winding of $ICT_1$ and the output terminal of the primary winding of $ICT_2$ follow two different rules because $ICT_1$ does not connect to the ending transformer directly. For example, the output terminal of the primary winding of $ICT_1$ connects to the input terminal of the secondary winding of $ICT_2$. But, the output terminal of the primary winding of $ICT_2$ connects directly to the input terminal of the primary winding of the ending transformer $ICT_3$.

Figure 1F:
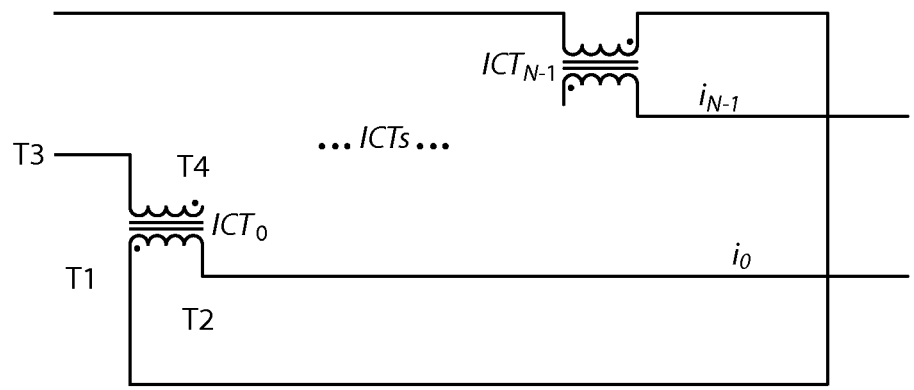
FIG. 1(f) shows a topology of N intercell transformer according to an embodiment of the present disclosure.

FIG. 1(f) shows a topology of N intercell transformers according to an embodiment of the present disclosure. The topology of FIG. 1(f) uses similar reference numerals as those in FIG. 1(c). The difference between the topology of FIG. 1(f) and FIG. 1(c) is explained as follows. In FIG. 1(f), the input terminal T3 of the secondary winding of each intercell transformer is connected to a power line (not shown). The output terminal T2 of the primary winding of each intercell transformer is connected to a resonant inverter. The output terminal T4 of the secondary winding of each intercell transformer is connected to the input terminal of the primary winding of an adjacent intercell transformer. The output terminal of the secondary winding of the ending transformer $ICT_{N-1}$ is connected to the input terminal T1 of the primary winding of the beginning transformer $ICT_0$.

Figure 1G:
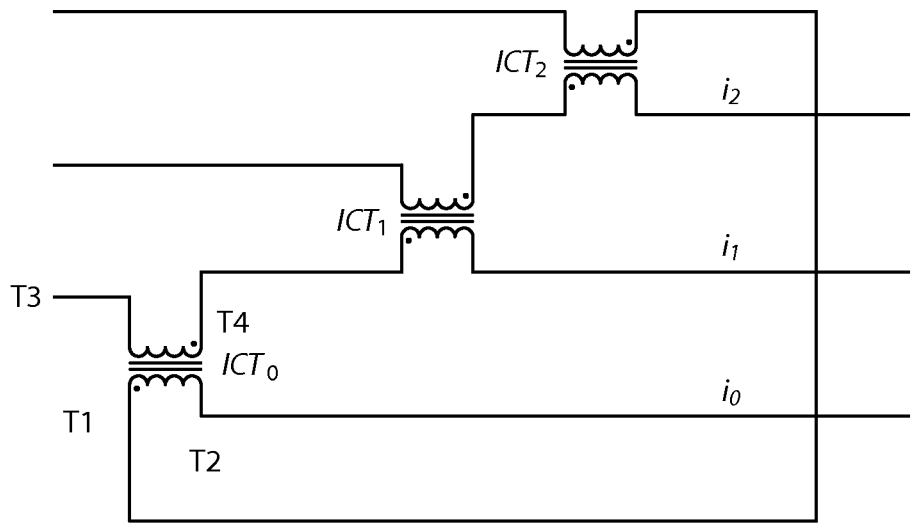
FIG. 1(g) shows a topology of three intercell transformer according to an embodiment of the present disclosure.

FIG. 1(g) shows the connection of three intercell transformers according to the topology in FIG. 1(f). Output currents $i_0$, $i_1$, and $i_2$ are output from the output terminals T2 of the primary winding of each transformer to the resonant inverter (not shown). The input terminal of the secondary winding of each transformer is connected to a power line, and each represents a phase in the control strategy, such as phase 1, phase 2, and phase 3. $ICT_0$, $ICT_1$, and $ICT_2$ are not only connected in a parallel manner but also are connected in an intertwined manner via the connections between the output terminal T4 of the secondary windings and the input terminal T1 of the primary windings of these transformers.

According to an embodiment, each switching leg comprises two switches with antiparallel diodes. The switches in all legs, preferably MOSFETs, are turned on and off alternately by rectangular voltage sources at a frequency f=ω/(2π) with a duty cycle slightly smaller than 50%. To minimize switching losses and EMI, transistors are turned on when their voltage is zero, yielding zero turn-on switching loss. However, zero-voltage-switching turn-on of all the transistors are at least achieved for inductive loads of all switching legs. According to another embodiment, the switching legs may be formed by a half-bridge inverter or a full-bridge inverter. According to a further embodiment, the switching legs may be identical to or different from each other.

The following analysis of the fixed-frequency phase-controlled multiphase inverter with a common resonant circuit presented in FIG. 1(a) is performed under the following simplifying assumptions:

1) The loaded quality factor $Q_L$ of the resonant circuit is high enough (e.g., $Q_L>3$) that the currents at the output of switching legs $i_k$ are sinusoidal.
2) The functions of the power MOSFETs are conceptualized as switches with a constant ON-resistance $r_{DS}$.
3) The reactive components of the resonant circuit are linear, time-invariant, and the operating frequency of the inverter circuit is much lower than the self-resonant frequencies of the reactive components.
4) All intercell transformers are identical. They are modeled as transformers with magnetizing inductance $L_{mag}$ and leakage inductance $L_{leak}$.

Voltage Transfer Function

In the inverter shown in FIG. 1(a), the switching legs and the DC input voltage $V_I$ form square-wave voltage sources. Since the currents $i_k$ at the switching leg outputs are sinusoidal, the power of the fundamental component of each input voltage source is transferred to the output. Therefore, the square wave voltage sources can be replaced by sinusoidal voltage sources $V_0, V_1, \ldots V_{N-1}$, which represent the fundamental components as shown in FIG. 1(b).

These fundamental components are shown in the following equation:

$$v_k = V_m \cos\left(\omega t + \frac{2k\phi}{N} - \frac{(N-1)\phi}{N}\right) \quad (1)$$

where k is from 0 to N-1. Magnitude is:

$$V_m = \frac{2}{\pi} V_I. \quad (2)$$

and ϕ is the normalized phase shift in a range from 0 to π which gives a full control range. The normalized phase shift represents the phase difference between the voltage and current signal. The voltages at the inputs of the resonant circuits are expressed in the complex domain by:

$$V_k = V_m e^{j\left(\frac{2k\phi}{N} - \frac{(N-1)\phi}{N}\right)} = V_m e^{j\left[\frac{(2k-N+1)\phi}{N}\right]}. \quad (3)$$

To calculate voltage across load resistance $R_L$, N voltage sources with intercell transformers are replaced by an equivalent single voltage source:

$$V_{mean} = \sum_{k=0}^{N-1} \frac{V_k}{N} \quad (4)$$

and the leakage inductor $L_s = L_{leak}/N$. The voltage across the load resistance is:

$$V_{R_L} = \frac{V_{mean} R_L}{R_L + j\omega(L+L_s) + \frac{1}{j\omega C}} = \quad (5)$$

$$= \frac{V_m R_L \frac{\sin\phi}{N \sin\frac{\phi}{N}}}{R_L + j\omega(L+L_s) + \frac{1}{j\omega C}} =$$

$$= \frac{2V_I R_L \frac{\sin\phi}{\sin\frac{\phi}{N}}}{N\pi\left[R_L + j\omega(L+L_s) + \frac{1}{j\omega C}\right]}.$$

The resonant frequency is:

$$\omega_o = \sqrt{\frac{1}{C(L+L_s)}}. \quad (6)$$

Rearrangement of (5) gives the DC-to-AC voltage transfer function $M_{VI}$ of the inverter:

$$M_{VI} \equiv \frac{V_{R_L}}{\sqrt{2}\,V_I} = \frac{\sqrt{2}\,V_I R_L \frac{\sin\phi}{\sin\frac{\phi}{N}}}{N\pi\left[R_L + j\omega(L+L_s) + \frac{1}{j\omega C}\right]}. \quad (7)$$

From equations (6) and (7), one can see that if $L+L_s$ is constant, resonant frequency $\omega_o$ and voltage transfer function $M_{VI}$ are not affected by leakage inductance $L_{leak}$. Moreover, in certain applications, such as DC/DC converters, leakage inductances of intercell transformers can be used as resonant inductors.

The DC-to-AC voltage transfer function of the actual inverter is:

$$M_{VIa} = \eta_I M_{VI} \quad (8)$$

where $\eta_I$ indicates the efficiency of the inverter as shown in FIG. 1(a).

Figure 2:
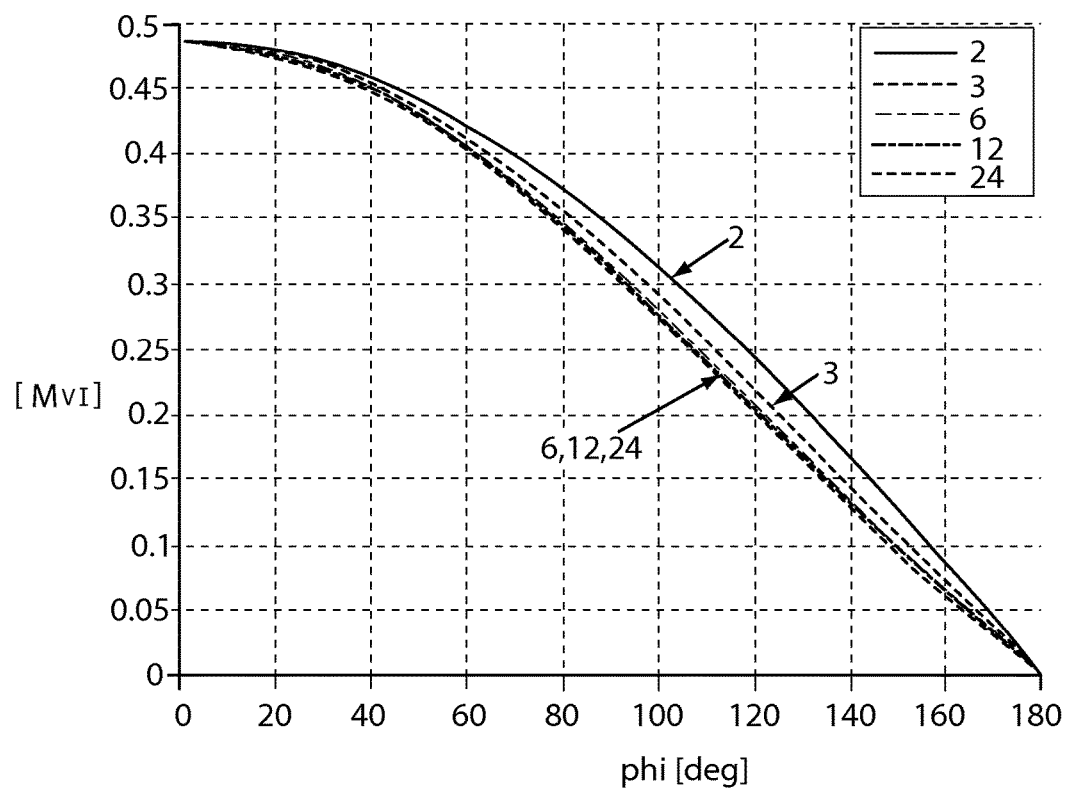
FIG. 2 shows a DC to AC transfer function of the inverter circuit as shown in FIG. 1(a) according to an embodiment of the present disclosure.

FIG. 2 illustrates $|MVI|$ as a function of normalized phase angle $\phi$ for various numbers of phases N, including N=2, 3, 6, 12, and 24. Other conditions used for generating FIG. 2 include $Q_L=3$, $\omega/\omega_o=1.15$, $L_{Leak}/L=0.1$, and the same resonant frequency. According to FIG. 2, one can see that $|MVI|$ is not affected much by the number of phases when the number of phases is equal to or greater than 3. Moreover, the value of $|MVI|$ at each of the ends of the regulation range, such as the normalized phase angle range, is substantially identical regardless of the number of phases.

Currents in the Inverter Circuits

Due to the use of intercell transformers, the output currents from the legs of the inverter are coupled with those of the neighboring phases. Therefore, one can obtain these currents as a solution of the following system of equations:

$$\sum_{k=0}^{N-1} I_k = \frac{V_{R_L}}{R_L} \quad (9)$$

$$I_k - I_{k+1} = \frac{2(V_k - V_{k+1})}{j\omega(4L_{mag} + 2L_{leak})} \quad (10)$$

where k runs from 0 to N−2, and $$\varphi_k = \frac{(2k-N+1)\phi}{N}. \quad (11)$$

The solution to equations 9 and 10 can be obtained iteratively as:

$$(N-k)I_k = \frac{V_{R_L}}{R_L} - \sum_{m=0}^{k-1} I_m + \sum_{m=1}^{N-1-k} [m(I_{N-m-1} - I_{N-m})] == \quad (12)$$

$$\frac{V_{R_L}}{R_L} - \sum_{m=0}^{k-1} I_m + \sum_{m=1}^{N-1-k} \frac{2m(V_{N-m-1} - V_{N-m})}{j\omega(4L_{mag} - 2L_{leak})}.$$

The output current is $$I_o = \sum_{k=0}^{N-1} I_k = \frac{V_{R_L}}{R_L} == \frac{\sqrt{2}\,V_I \frac{\sin\phi}{\sin\frac{\phi}{N}}}{N\pi\left[R_L + j\omega(L+L_s) + \frac{1}{j\omega C}\right]}. \quad (13)$$

Figure 3:
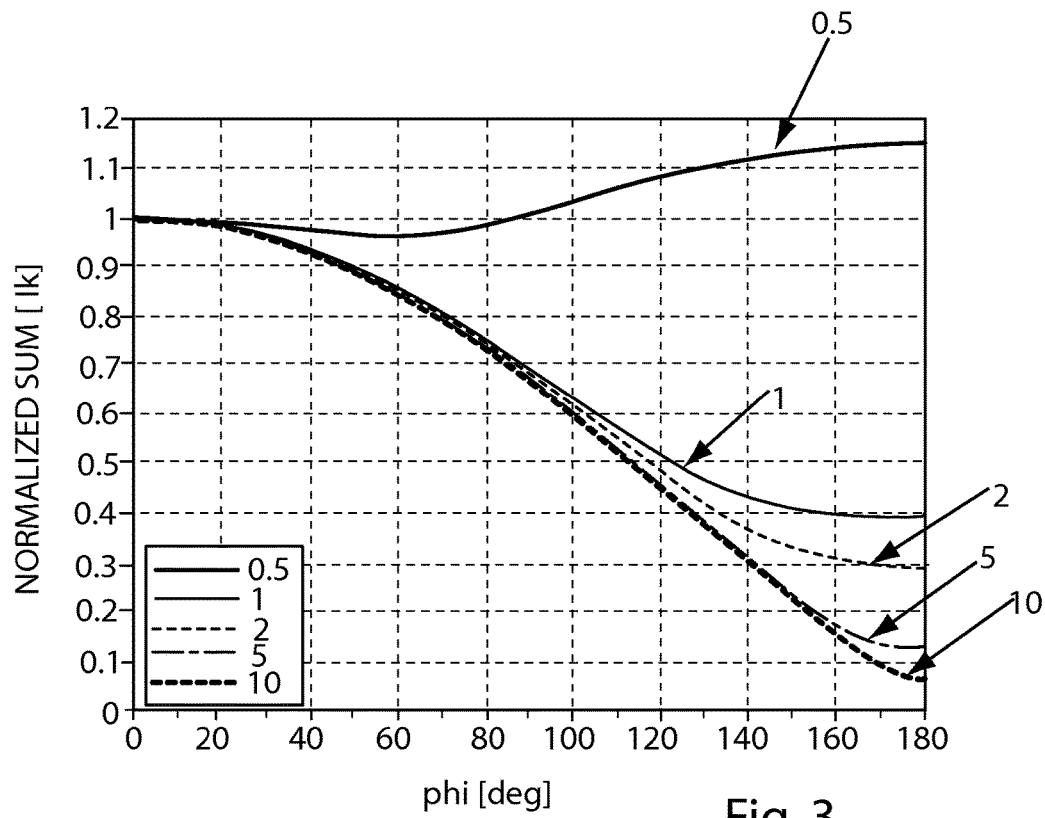
FIG. 3 shows a relationship between output currents of the inverters and inductance of the intercell transformers of the inverter circuit as shown in FIG. 1(a) according to an embodiment of the present disclosure.
Figure 4:
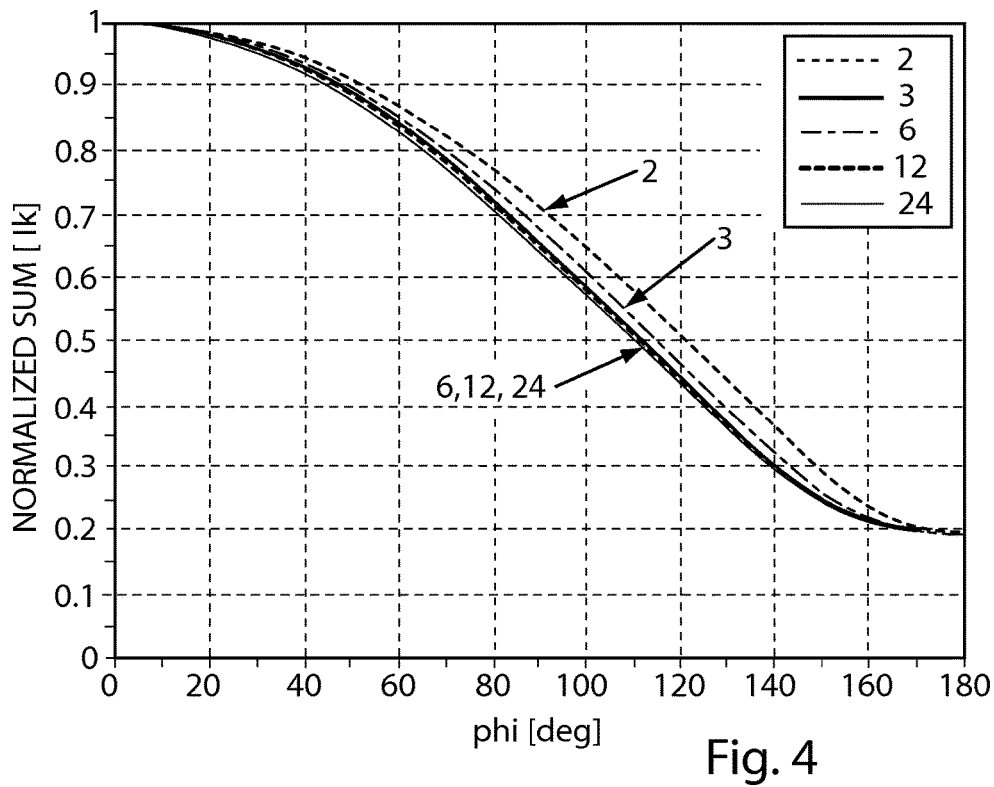
FIG. 4 shows a relationship between output currents of the inverters and the number of phases of the inverter circuit as shown in FIG. 1(a) according to an embodiment of the present disclosure.

FIGS. 3 and 4 illustrate output currents of each of the N legs of the inverter by showing the sum of current magnitudes $\Sigma|I_K|$. FIG. 3 shows the effect of intercell transformer magnetizing inductance $L_{mag}$ on the circulating currents which are responsible for high current amplitude at high values of phase angle $\phi$. In FIG. 3, currents are normalized to currents at $\phi=0$, assuming N=3, $Q_L=3$, and $\omega/\omega_o=1.15$. $L_{mag}/L$ is varied from 0.5 to 1, 2, 5, and 10. One can see that circulating currents decrease when the magnetizing inductance of the intercell transformers $L_{mag}$ increases.

FIG. 4 shows how the number of phases N affects circulating currents. In FIG. 4, currents are normalized to currents at $\phi=0$, assuming $Q_L=3$, $\omega/\omega_o=1.15$, and $L_{mag}/L=N$. N is varied from 2 to 3, 6, 12, and 24. One can see that for a high number of phases N, a higher magnetizing inductance of intercell transformers is needed to keep the same level of circulating currents. Otherwise, circulating currents will be large for higher number of phases which may lead to poor efficiency at high values of phase angle $\phi$.

Boundary Between Capacitive and Inductive Load

To determine whether the switches are loaded capacitively or inductively, the impedances seen by the switching legs at the fundamental frequency are calculated and their angles are examined. The impedance seen by the voltage source $V_k$ is:

$$Z_k \equiv \frac{V_k}{I_k} \equiv |Z_k|e^{j\psi_k}. \tag{14}$$

Figure 5:
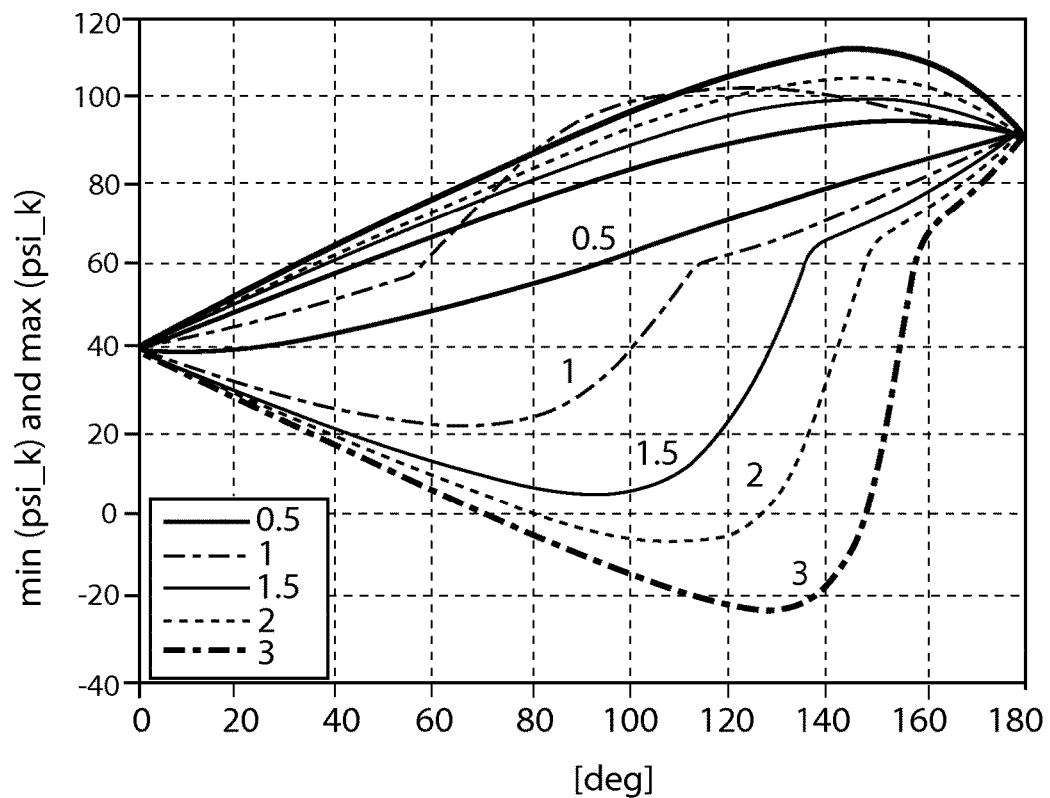
FIG. 5 shows a relationship between minimum and maximum principle arguments of the impedance seen by the inverter portion and the inductance of the intercell transformers of the inverter circuit as shown in FIG. 1(a) according to an embodiment of the present disclosure.

FIG. 5 depicts principle arguments $\psi_k$ as functions of $\phi$. In FIG. 5, inductance values are normalized to the resonant inductance, assuming N=3, $Q_L$=3, $\omega/\omega_o$=1.15, and $L_{mag}/L$=0.5, 1, 1.5, 2, and 3. One can see that for limited values of $L_{mag}/L$ all $\psi_k$ are within the range of 0° and 180°. This indicates that all inverters are loaded by inductive loads.

Three-Phase Resonant Inverter Topology

Figure 6A:
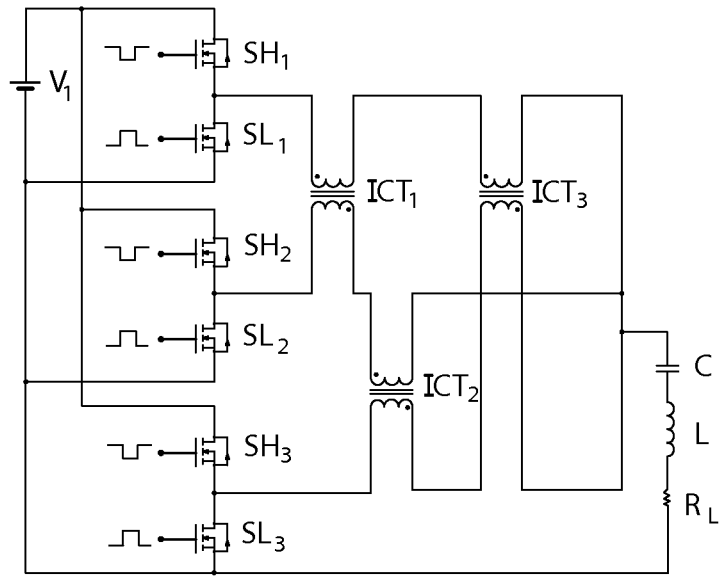
FIG. 6(a) shows an inverter circuit in three phase half-bridge configuration having three intercell transformers according to an embodiment of the present disclosure.
Figure 6B:
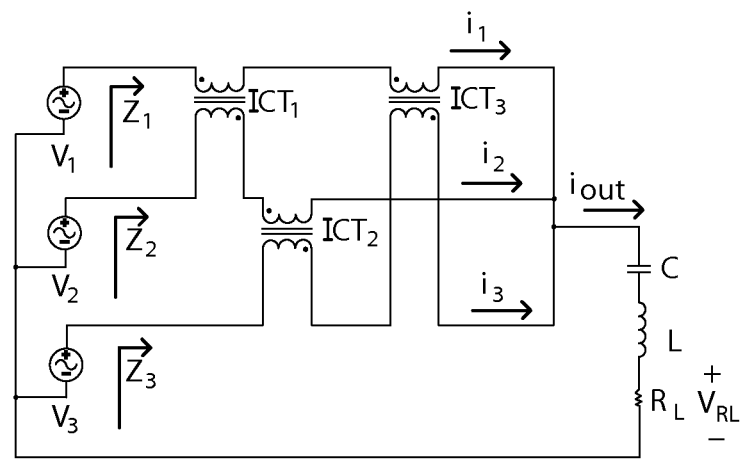
FIG. 6(b) shows an equivalent circuit for the fundamental component of the inverter circuit as shown in FIG. 6(a) according to an embodiment of the present disclosure.

FIG. 6(a) shows an inverter circuit having three intercell transformers according to an embodiment of the present disclosure. FIG. 6(b) shows an equivalent circuit for the fundamental components of the inverter circuit, similar to that shown in FIG. 1(a), according to an embodiment of the present disclosure. The inverter circuit in FIG. 6(a) has similar topology as that in FIG. 1(a), except that, for the simplification of explanation, the inverter circuit in FIG. 6(a) has three intercell transformers rather than N intercell transformers. All the assumptions of the inverter circuit of FIG. 1(a) are also valid for the inverter circuit in FIG. 6(a) in the following circuit analysis. Furthermore, the inverter circuit in FIG. 6(a) also considers that the intercell transformers have magnetizing inductance $L_{mag}$, leakage inductance $L_{leak}$ and series resistance $r_{ict}$.

Voltage Transfer Function

Similar to the analysis of the circuit in FIG. 1(b), the fundamental components in FIG. 6(b) are:

$$v_1 = V_m \cos(\omega t - \phi_1),$$

$$v_2 = V_m \cos(\omega t),$$

$$v_3 = V_m \cos(\omega t + \phi_2), \tag{15}$$

where magnitude $V_m$ is:

$$V_m = \frac{2}{\pi} V_I \tag{16}$$

and $\phi_1$ and $\phi_2$ represent the phase shifts in the range from 0 to $\pi$. The voltages at the inputs of the resonant circuits are expressed in the complex domain by:

$$V_1 = V_m e^{-j(\phi_1)}, V_2 = V_m, V_3 = V_m e^{j(\phi_2)}. \tag{17}$$

To calculate voltage across the load resistance $R_L$, three voltage sources with intercell transformers are replaced with a single voltage source:

$$V_{mean} = \frac{V_1 + V_2 + V_3}{3} \tag{18}$$

And inductor:

$$L_s = \frac{L_{leak}}{3}. \tag{19}$$

The voltage across the load resistance is:

$$V_{R_L} = \frac{V_{mean} R_L}{R_L + j\omega(L + L_s) + \frac{1}{j\omega C}} \tag{20}$$

The resonant frequency is:

$$\omega_o = \sqrt{\frac{1}{C(L + L_s)}}, \tag{21}$$

The load quality factor is:

$$Q_L = \frac{\omega_o(L + L_s)}{R_L} = \frac{1}{\omega_o R_L C}. \tag{22}$$

When equation 20 is rearranged, the DC to AC voltage transfer function of the inverter is:

$$M_{VI} \equiv \frac{V_{R_L}}{\sqrt{2} V_I} = \frac{V_{mean} R_L}{\sqrt{2} V_I \left[ R_L + j\omega(L + L_s) + \frac{1}{j\omega C} \right]} \tag{23}$$

Based on equations 21 and 23, it can be found that if $L+L_s$ is constant, the resonant frequency $\omega_o$ and voltage transfer function $M_{VI}$ are not affected by leakage inductance $L_{leak}$.

Currents of the Inverter

Similar to the analysis of the inverter in FIG. 1(a), the output current $I_o$ of the inverter in FIG. 6(a) is:

$$I_o = \sum_{k=0}^{N-1} I_k \tag{24}$$

$$= \frac{V_{R_L}}{R_L} =$$

$$= \frac{V_{mean}}{R_L + j\omega(L + L_s) + \frac{1}{j\omega C}}.$$

Also, due to the use of intercell transformers $ICT_1$, $ICT_2$, and $ICT_3$, output currents from the legs of the inverter are coupled with each other. Therefore, one can obtain these currents through solving the following equations:

$$I_1 + I_2 + I_3 = I_o, \tag{25}$$

$$I_1 - I_2 = \frac{2(V_1 - V_2)}{j\omega(4L_{mag} + 2L_{leak})},$$

$$I_2 - I_3 = \frac{2(V_2 - V_3)}{j\omega(4L_{mag} + 2L_{leak})}.$$

A solution to the above current equations is:

$$3I_1 = I_o + \frac{4V_1 - 2V_2 - 2V_3}{j\omega(4L_{mag} + 2L_{leak})}, \tag{26}$$

-continued $$2I_2 = I_o - I_1 + \frac{2(V_2 - V_3)}{j\omega(4L_{mag} + 2L_{leak})},$$

$$I_3 = I_o - I_1 - I_2$$

From the above solution, one can have the following observations:

If $V_1$, $V_2$, and $V_3$ are equal, such as when all legs are powered by the same power source, all currents $I_1$, $I_2$, and $I_3$ are equal. Such a scenario represents the case of a frequency control method, in which phase shifts $\phi_1$ and $\phi_2$ are equal to zero. In this situation, the frequency of the input voltage controls the output current $I_o$.

Boundary for Zero-Voltage-Switching (ZVS)

In the proposed topology, similar with many other resonant inverters, zero-voltage-switching can be obtained at least for switch turn-on or turn-off, but may be a challenge to obtain ZVS for both of them. Obtaining ZVS for turn-on is preferred due to higher efficiency and lower EMI. Zero-voltage-turn-on occurs when the switching leg is loaded with an inductive type of load and there is enough energy stored in the resonant circuit to recharge the parasitic capacitance of the switching leg. To determine whether the switches are loaded capacitively or inductively, the impedances seen by the switching legs at the fundamental frequency are calculated and their angles are examined.

The impedance seen by the voltage source has been shown in equation 14. Charge stored in the parasitic capacitance $C_{oss}$ of switching leg $Q_{oss}$ is:

$$Q_{oss} = C_{oss} V_I. \quad (27)$$

With the determined necessary charge $Q_{oss}$, the minimum phase shift can be obtained from the following equation:

$$\int_0^{\frac{\phi}{\omega}} I_m \sin\omega t \, dt \geq Q_{oss} \quad (28)$$

$$\frac{I_m}{\omega}(1 - \cos\phi) \geq Q_{oss}$$

$$\cos\phi \leq 1 - \frac{\omega Q_{oss}}{I_m}$$

$$\phi \geq \arccos\left(1 - \frac{\omega Q_{oss}}{I_m}\right).$$

where $I_m$ is the magnitude of each phase current.

Efficiency of the Inverter

To determine the efficiency of the inverter, losses in all components need to be determined. Conductive losses for different inverter components can be calculated using the following equations:

$$P_{sw} = \frac{I_m^2}{2} r_{dson}, \quad (29)$$

$$P_{ict} = \left(\frac{I_m 1^2}{2} + \frac{I_m 2^2}{2}\right) r_{ict},$$

$$P_C = \frac{I_m^2}{2} ESR_C,$$

$$P_L = \frac{I_m^2}{2} r_L,$$

where $P_{sw}$ is the conduction loss in the switching leg, $P_{ict}$ is the loss in the intercell transformer, $P_C$ is the loss in the resonant capacitor, $P_L$ is the loss in the resonant inductor, $r_{dson}$ is the turning-on resistance of the MOSFET transistors used in the switching leg, $r_{ict}$ is the series resistance of a single winding of the intercell transformer, $r_L$ is the series resistance of the resonant inductor, and $r_C$ is an equivalent series resistance of the resonant capacitor.

Due to zero-voltage-turn-on switching, losses are related only to turning-off. Detailed analysis of turning-off losses $P_{ssw}$ can be approximated by:

$$P_{ssw} = \frac{\omega}{2\pi}\left(\frac{2t_r}{3} + t_f\right) V_I I_m \sin\theta, \quad (30)$$

where $\theta$ is the phase shift between voltage and current in the switching leg output, $t_f$ is current fall time, and $t_r$ is current rise time.

Overall losses for a three phase inverter with a common resonant circuit are:

$$P_{Tssw} = \sum_{i=1}^{3} \frac{\omega}{2\pi}\left(\frac{2t_r}{3} + t_f\right) V_I I_i \sin\theta_i, \quad (31)$$

$$P_{Tsw} = \sum_{i=1}^{3} \frac{I_i^2}{2} r_{dson},$$

$$P_{Ticti} = \sum_{i=1}^{3} I_i^2 r_{ict},$$

$$P_C = \frac{I_o^2}{2} ESR_C,$$

$$P_L = \frac{I_o^2}{2} r_L,$$

$$P_T = P_{Tssw} + P_{Tsw} + P_{Ticti} + P_C + P_L.$$

where $P_T$ is the total loss, $P_{Tssw}$ is the total turning-off loss at switch legs, $P_{Tsw}$ is the total conduction loss of the switch leg, and $P_{Ticti}$ is the total loss of the intercell transformer.

Therefore, the efficiency of the inverter is:

$$\eta = \frac{P_{RL}}{P_{RL} + P_T}, \quad (32)$$

where $P_{RL}$ is the power dissipated in the load resistance, which can be calculated as:

$$P_{RL} = \frac{I_o^2}{2} R_L. \quad (33)$$

Methods of Controlling the Inverter

In the three phase resonant inverter as shown in FIG. 6(a), there are two control phase shifts $\phi_1$ and $\phi_2$, which allow new control methods in addition to traditional control methods. According to an embodiment, two types of control methods, symmetrical and asymmetrical phase control, can be applied to the inverter as shown in FIG. 6(a).

A. Symmetrical Phase Control

In symmetrical phase control, both control phase shifts are equal to each other ($\phi_1 = \phi_2 = \phi_3$). Then equations (17) and (18) can be rewritten as:

$$V_1 = V_m e^{-j(\phi)}, V_2 = V_m, V_3 = V_m e^{j(\phi)} \quad (34)$$

$$V_{mean} = V_m \frac{1 + 2\cos\phi}{3}.$$

As a result, the voltage transfer function (23) is simplified as:

$$M_{VI} = \frac{V_m R_L (1 + 2\cos\phi)}{3\sqrt{2} V_I \left[ R_L + j\omega(L + L_s) + \frac{1}{j\omega C} \right]}. \quad (35)$$

The derived simplified equation for symmetrical phase control makes inverter analysis and calculation much easier. On the other hand using symmetrical phase control may not be the optimal choice in terms of efficiency, operating frequency or switch stresses. Therefore asymmetrical phase control is also used.

B. Asymmetrical Phase Control

Opposite to symmetrical phase control, both control phase shifts in the asymmetrical phase control are independent, which gives a wide area for control strategy optimization. The phase shift may be achieved by individually adjusting the physical parameters of the intercell transformer. Use of asymmetrical phase control may result in significant improvement in efficiency. It also allows the inverter to operate closer to resonant frequency. To illustrate the asymmetrical phase control, certain theoretical analysis and calculations were done for a three phase inverter having the following parameters: $f/f_o=1:15$, $Q_L=5$, $L_{mag}=L$ and $L_{leak}=0$. The analysis and calculations show various performance evaluators as functions of phase shifts $\phi_1$ and $\phi_2$. The analysis and calculation results are presented in FIGS. 7-9.

Figure 7:
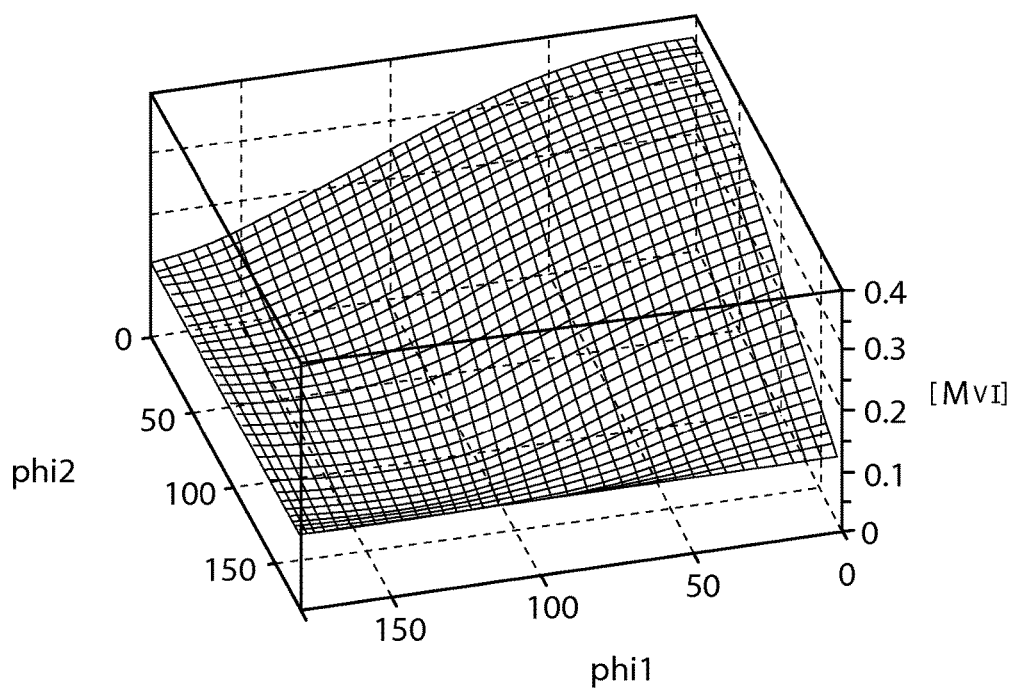
FIG. 7 shows a DC to AC transfer function of the inverter circuit as shown in FIG. 6(a) according to an embodiment of the present disclosure.

FIG. 7 shows the voltage transfer function $M_{VI}$ of the inverter as a function of phase shifts. It was calculated from equation (23). One can see that the plot in FIG. 7 is symmetrical against the $\phi_1=\phi_2$ plane, which means that $M_{VI}(\phi_1, \phi_2)=M_{VI}(\phi_2, \phi_1)$. From the plot, one can also see that there is a maximum of the function at point (0; 0) and minimum at point (120; 120). This minimum has a value equal to zero. Thus, any trajectory or path from point (0; 0) to point (120; 120) will give the full regulation range.

Figure 8A:
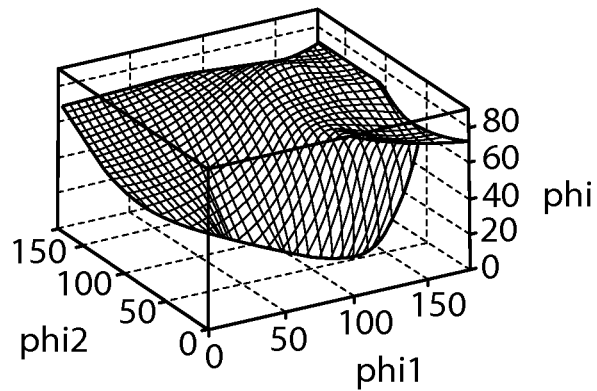
FIG. 8(a) shows a relationship between minimum principle arguments of the impedance seen by the inverter portion and the phase shifts of the inverter circuit as shown in FIG. 6(a) according to an embodiment of the present disclosure.
Figure 8B:
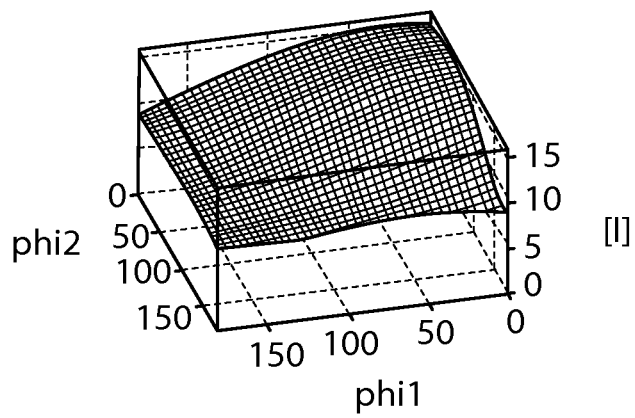
FIG. 8(b) shows a relationship between maximum phase current magnitude and phase shifts of the inverter circuit shown in FIG. 6(a) according to an embodiment of the present disclosure.
Figure 8C:
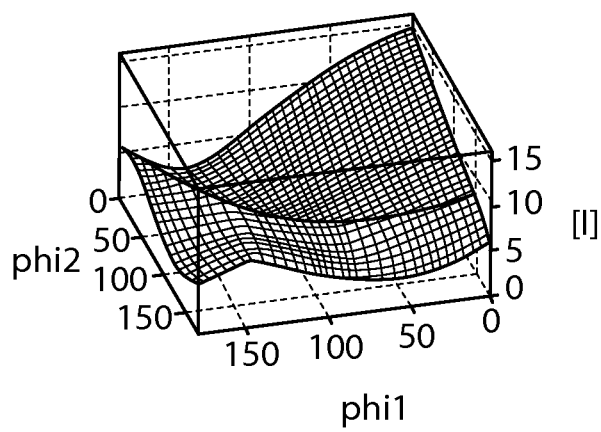
FIG. 8(c) shows a relationship between minimum phase current magnitude and phase shifts of the inverter circuit as shown in FIG. 6(a) according to an embodiment of the present disclosure.

FIG. 8(*a*) shows the minimum of impedance arguments seen by the switching legs of the inverter as a function of phase shifts. As described before, to achieve ZVS the inductive type of load for the switching leg is preferred, which means that the principle argument $\psi_k$ should be greater then zero. As shown in FIG. 8(*a*), there are multiple available trajectories which will result from different minimum values of $\psi_k$. The minimum value of $\psi_k$ may be maximized by proper choice of the control trajectory. As a result, the operating frequency of the inverter can be set closer to the resonant frequency.

Figure 9:
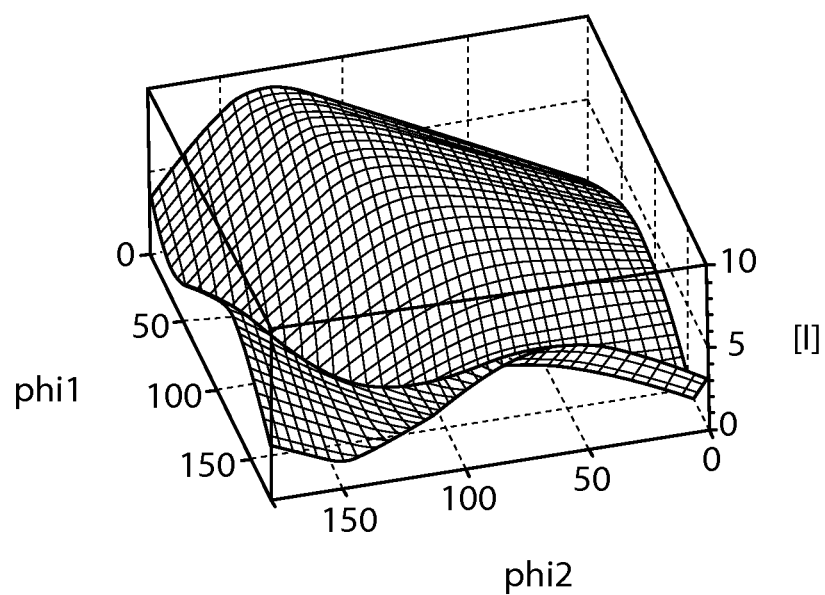
FIG. 9 shows a relationship between maximum and minimum phase current magnitude difference and phase shifts of the inverter circuit as shown in FIG. 6(a) according to an embodiment of the present disclosure.

FIGS. 8(*b*), 8(*c*), and 9 illustrate the behavior of phase currents as a function of phase shifts. FIG. 8(*b*) illustrates the maximum magnitude of phase currents. It shows that in some cases the current is higher than at point (0; 0) which is a maximum of the transfer function. Nevertheless this increase of current is not significant. FIG. 8(*c*) illustrates the minimum magnitude of the phase currents. FIG. 9 illustrates the difference between minimum and maximum magnitudes of the phase currents. It clearly shows that some control trajectories result from a significant unbalance in phase currents. It may lead to an increase of switch losses at low and medium power levels.

Hybrid Control Methods

There are two traditional control methods for resonant inverters which provide good regulation performance. One is frequency control. The other is phase control. Both of them are commonly used, however they have well known disadvantages. For example, frequency control requires a high tuning resolution close to the resonant frequency. At the other end, at low power, frequency control requires operating at significantly higher frequency which usually results in poor efficiency at light loads. Moreover, frequency control is highly non-linear, which results in a significant difference in gain for light and heavy load. Although these frequency-specific problems can be solved by using a traditional phase control method which operates at constant frequency, the traditional phase control method requires operating at a frequency high enough to obtain zero-voltage-switching for the whole regulation range and different loads. This affects efficiency and limits output power.

According to an embodiment of the present disclosure, a hybrid control strategy can overcome the drawbacks associated with either the frequency or the phase control technique. Combining two traditional control methods results in a phase-frequency control. According to an embodiment, one objective of the operation is to utilize phase shift for regulating output, such as current, and operating frequency as close to resonance as possible. In such a case, there are two constraints for operating frequency. The first requires an inductive type of load for all switching legs. The second is minimum phase shift obtained from equation (28). According to an embodiment, both conditions are present to obtain zero-voltage-turn-on. According to another embodiment, operating frequency is preferably greater or equal to resonant frequency. This condition prevents operating below resonance which may lead to efficiency drop.

As mentioned before, phase-shifts are responsible for regulating the output according to an embodiment of the present disclosure. The topology as disclosed in the present disclosure gives several possibilities of phase control, described as symmetrical and asymmetrical phase control. In all cases, phase trajectory is predetermined. Operating frequency is adjusted as described before, so its range depends on inverter design, load and chosen phase control trajectory.

According to an embodiment, the inverter is adjusts the AC voltage magnitude of its output to generate desired voltage and current. Information obtained from the rectifier (such as battery voltage and current) are used as the feedback information in a control loop. According to an embodiment, a typical negative feedback loop is used. A hybrid control uses both frequency and phase shift to manage the output of a multiphase resonant inverter as set forth in the present disclosure. The output regulation is obtain by the phase shift between switching legs while frequency is adjusted to operate as close as possible to resonant frequency without losing zero-voltage-switching (ZVS) conditions.

Figure 31A:
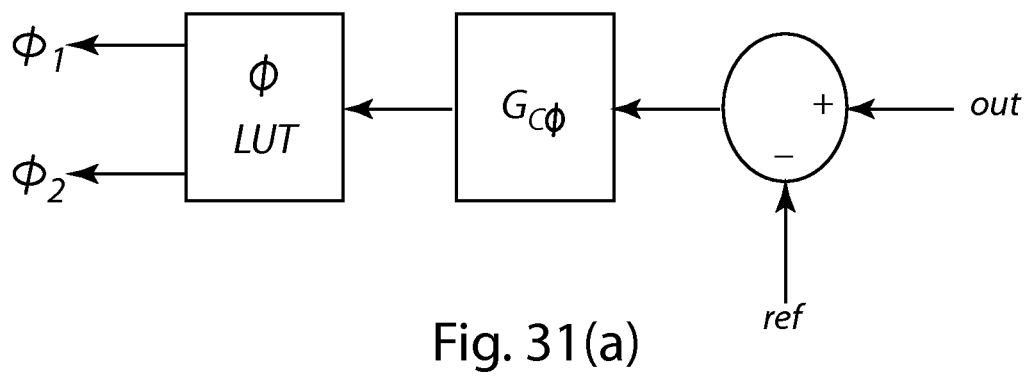
FIG. 31(a) shows a phase control loop for a resonant inverter according to an embodiment of the present disclosure.

FIGS. 31(*a*) and 31(*b*) show control loops of a hybrid control method according to an embodiment of the present disclosure. A three-phase inverter control method may have two independent control loops. One loop shown in FIG. 31(*a*) controls the phase shifts, and the other one shown in FIG. 31(*b*) controls the frequency. A three-phase inverter can be controlled by using two phase shifts, $\Phi_1$, between phase 0 and 1, and $\Phi_2$, between phase 1 and 2. The phase-shift trajectory is stored in a look-up-table (LUT). The LUT converts the output signal from a compensator $G_{C\Phi}$ to the specific phase-shifts Φ1 and Φ2. The input to the compensator $G_{C\Phi}$ is the difference between the reference ref and the output out. Thus, the regular negative feedback loop is obtained. The reference ref here is desired current or voltage value. The output signal out corresponds to the output measurement on the rectifier, in particular output voltage or current.

Figure 31B:
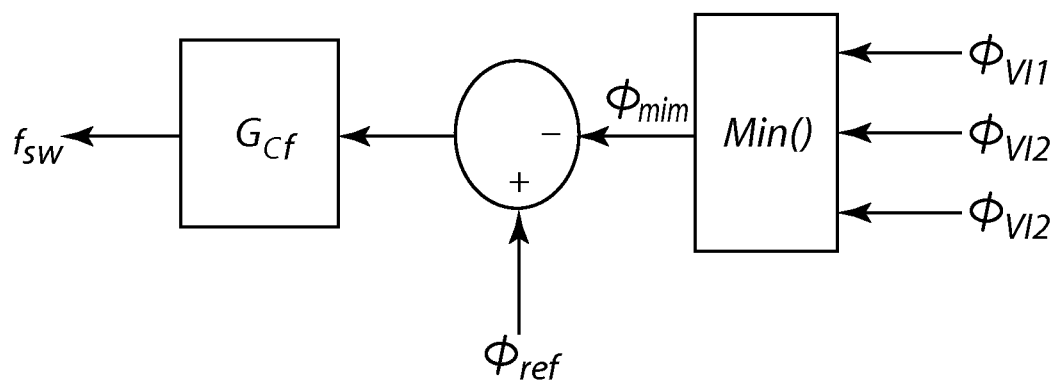
FIG. 31(b) shows a frequency control loop for a resonant inverter according to an embodiment of the present disclosure.

The control loop shown in FIG. 31(b) adjusts the operating frequency of the inverters. It is independent from the first control loop of FIG. 31(a), but the two control loops affect each other through the inverter. For instance, frequency also affects output. The frequency is adjusted based on the phase shift between the voltage and current measurements on the inverter switching leg outputs. From the current and voltage measurements at this point, the phase shifts $\Phi_{VIX}$ are obtained where X is the number of the particular phase. To obtain ZVS conditions a switching leg must see the inductive type of load, which means that the current lags voltage. Thus, the mentioned phase shift will be positive. As ZVS conditions are desired in all switching legs of the inverter, the minimum of those phase shifts, $\Phi_{min}$, is obtained and compared with the reference value $\Phi_{ref}$. The difference between $\Phi_{min}$ and $\Phi_{ref}$ is applied to the input of the compensator $G_{Cf}$. The output of $f_{sw}$ of this compensator defines the operating frequency. Thus, this loop maintains the minimum phase shift $\Phi_{min}$ at the desired level defined by $\Phi_{ref}$. The $\Phi_{ref}$ value is chosen to allow ZVS operation in the desired range of parameters and operating conditions.

A plurality of control strategies are demonstrated and compared in this disclosure. As a reference for comparison, the frequency control strategy is used as a reference. It is compared with several hybrid control methods which are either symmetrical phase-frequency or asymmetrical phase-frequency control. Four cases of control strategies are compared as examples, including:

1) Frequency control,
2) Symmetrical phase-frequency control,
3) Asymmetrical phase-frequency control,
3a) At the beginning $\phi_1=0$, $\phi_2$ changes from 0 to 2π/3; then $\phi_2=2\pi/3$ and $\phi_1$ changes from 0 to 2π/3.
3b) At the beginning $\phi_2=0$, $\phi_1$ changes from 0 to 2π/3; then $\phi_1=2\pi/3$ and $\phi_2$ changes from 0 to 2π/3.

Figure 10:
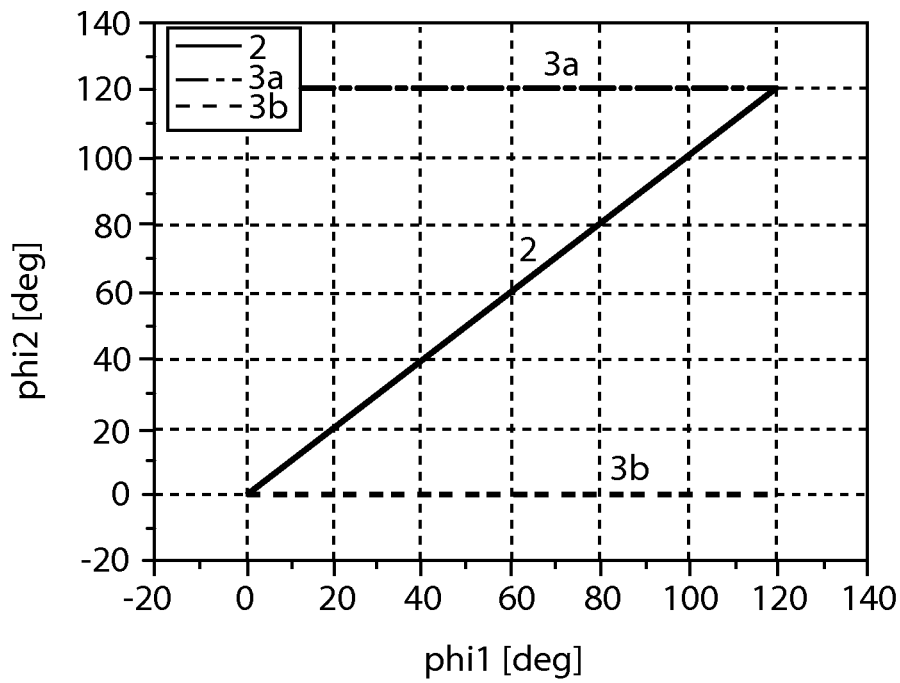
FIG. 10 shows phase control trajectories according to an embodiment of the present disclosure.

FIG. 10 illustrates the control trajectories of 2, 3a, and 3b.

To compare the performance of each control method, an inverter with parameters as shown in the following Table I is devised. The efficiency and frequency of the inverter corresponding to each control method are calculated and presented in FIGS. 11 and 12.

TABLE I

CONVERTER PARAMETERS FOR CONTROL STRATEGIES COMPARISON

| Parameter | Value | Unit |
|---|---|---|
| $f_o$ | 150 | kHz |
| $V_I$ | 240 | V |
| $R_L$ | 2 | ohm |
| L | 20 | μH |
| $L_{mag}$ | 30 | μH |
| $L_{leak}$ | 3 | μH |
| C | 53 | nF |
| $C_{oss}$ | 500 | pF |
| $t_r$ | 25 | ns |
| $t_f$ | 25 | ns |
| $r_{dson}$ | 100 | mohm |

TABLE I-continued

CONVERTER PARAMETERS FOR CONTROL STRATEGIES COMPARISON

| Parameter | Value | Unit |
|---|---|---|
| $r_{ict}$ | 30 | mohm |
| $r_L$ | 30 | mohm |
| $ESR_C$ | 5 | mohm |

Figure 11:
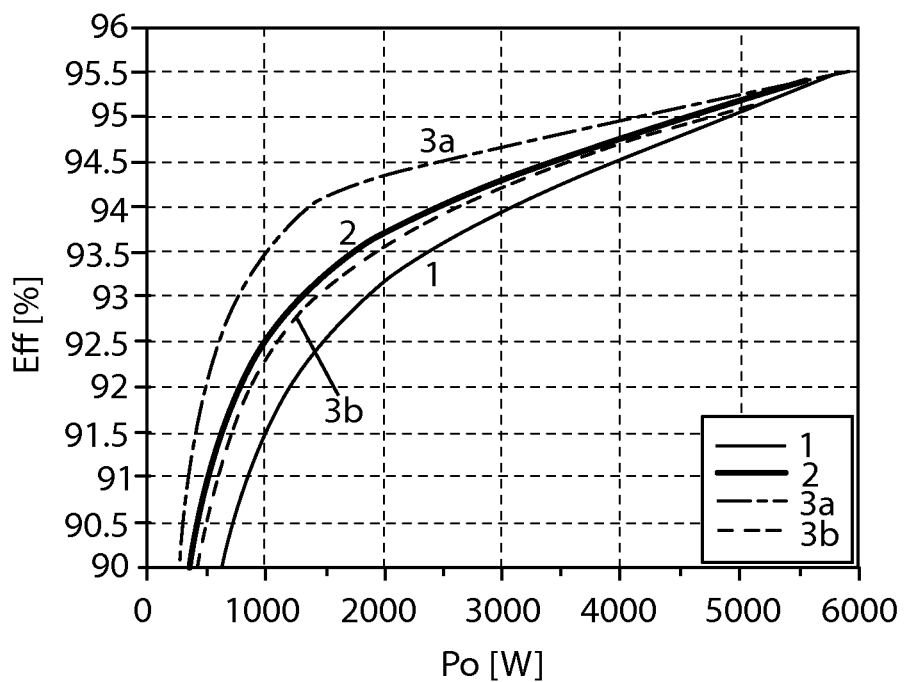
FIG. 11 shows a relationship between inverter efficiency and output power for various control strategies according to an embodiment of the present disclosure.

FIG. 11 shows that utilizing the hybrid control method results in higher efficiency than the frequency control method. The reference numerals, such as 1, 2, 3a, and 3b, represent the different control strategies, as specified in previous paragraphs of this disclosure. There is up to 2% efficiency improvement in case 3a, which is asymmetrical phase-frequency control. Moreover, the proposed control methods result in efficiency improvement over a wide range of output power. The resonant frequency $f_o$ of this inverter is designed to be 150 kHz.

Figure 12:
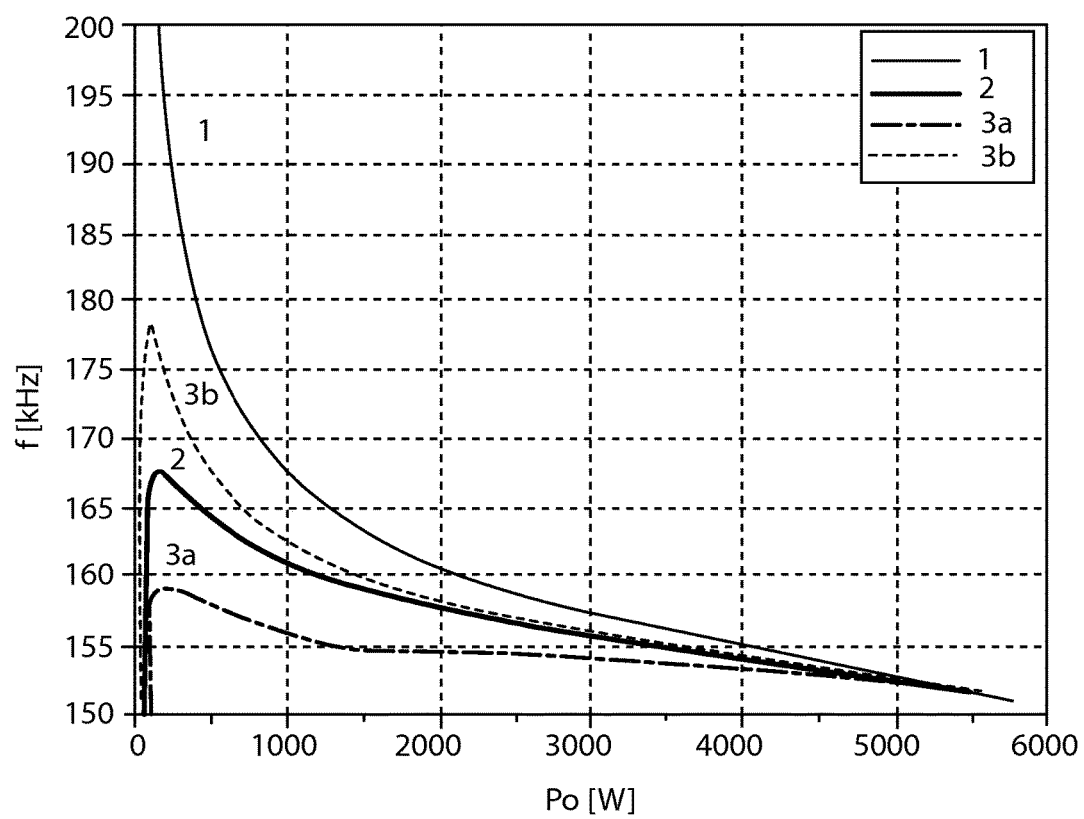
FIG. 12 shows a relationship between inverter operating frequency and output power for various control strategies according to an embodiment of the present disclosure.

FIG. 12 shows the operating frequency of the inverter for the compared control strategies. The x-axis represents the output power $P_o$, while the y-axis represents the operating frequency f. One can see that for hybrid control methods the operating frequency is significantly lower. Especially in case 3a, the operating frequency stays close to the resonant frequency over the whole regulation range. This may result in additional efficiency improvement in some application like wireless power transfer.

Experimental Setup

Figure 13:
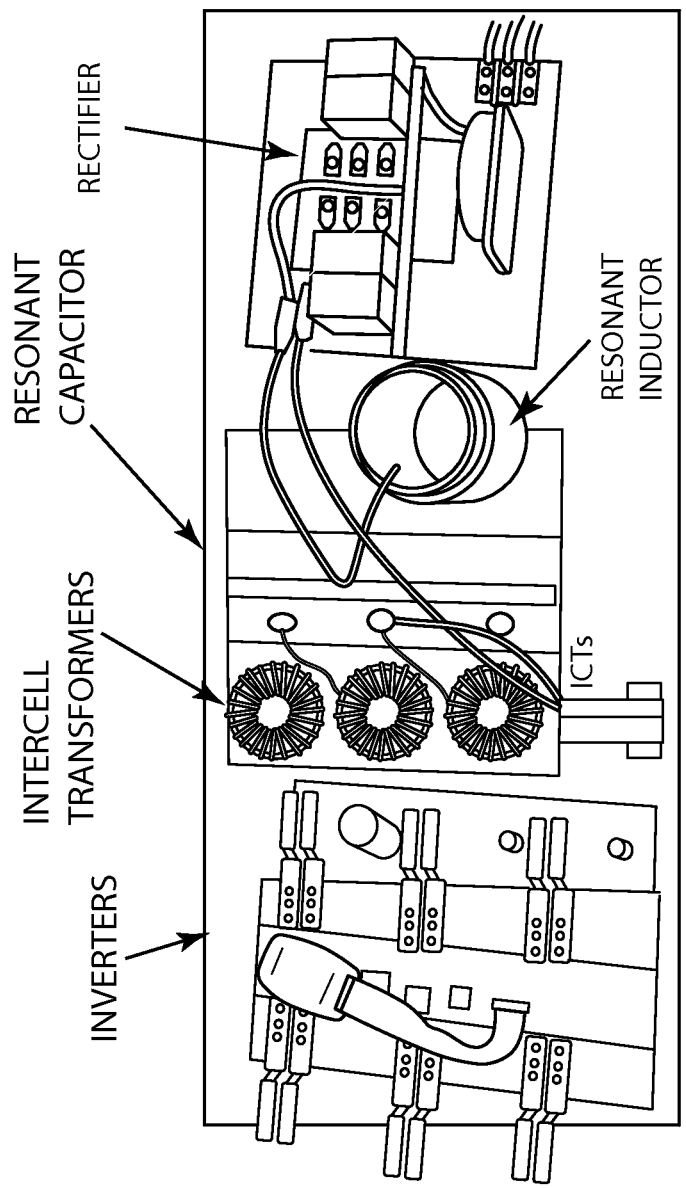
FIG. 13 shows the construction of a resonant inverter prototype reduced to practice according to an embodiment of the present disclosure.

A prototype of the present inverter shown in FIG. 6(a) was constructed. A controller card was designed to allow implementation of the different control strategies described herein. The phase and frequency modulator is implemented by using a Xilinx, Model XC6SLX9 FPGA modulator. To provide accurate phase and frequency regulation, the FPGA modulator is operated with a 199.5 MHz clock. This results in a frequency step equal to 113 Hz and 0.27° phase step at 150 kHz frequency of output signals. Control and diagnostic functions were implemented in a Model STM32F407 ARM-Cortex microcontroller. This permits the inverter to be controlled and supervised from a PC via the RS485 interface. The experimental test setup is shown in FIG. 13.

Experimental Results of a First Inverter

For the first inverter prototype, six IRGP4063D IGBT transistors were used. The inverter was loaded with a full-bridge current driven rectifier with a resistive load. The rectifier was built using four DSEI2X101-06A diodes. The DC load was 2 ohms which results in 1.62 ohms of the corresponding ac load $R_L$. For calculations, the efficiency of the inverter was assumed as 90%. The differences between experimental and theoretical results are caused by voltage drops on the rectifier diodes and IGBT transistors, which were not taken into account in the calculations. The following Table II shows the parameters and components of a first inverter to evaluate its performance and the hybrid control methods as previously described.

TABLE II

| Parameter | Value | Unit |
|---|---|---|
| N | 3 | — |
| $f_o$ | 146 | kHz |
| f | 167 | kHz |
| $V_I$ | 240 | V |
| $R_L$ | 1.62 | ohm |
| L | 20 | μH |

TABLE II-continued

| Parameter | Value | Unit |
|---|---|---|
| $L_{mag}$ | 24 | µH |
| $L_{leak}$ | 2.6 | µH |
| C | 57 | nF |
| $P_O$ | 550 | W |

Figure 14:
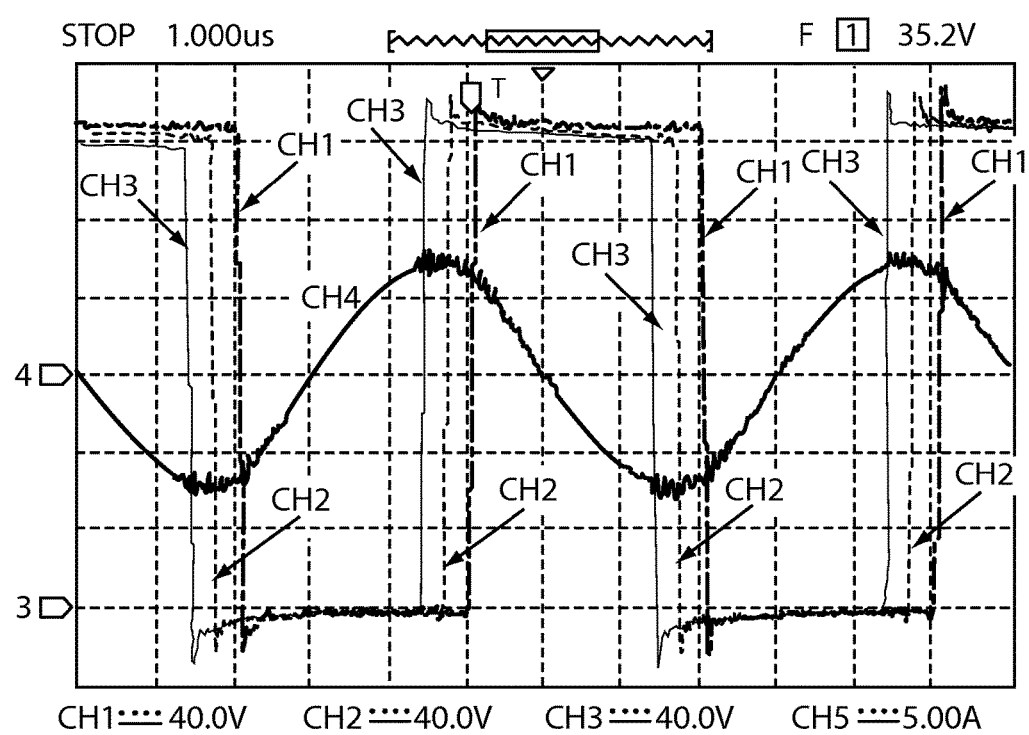
FIG. 14 shows voltage and current waveforms at the output of the inverter portion of the resonant inverter as shown in FIG. 13 according to an embodiment of the present disclosure.

FIG. 14 illustrates the measured voltage and waveforms at the output of the switching legs. Channels 1, 2, and 3 ("CH1," "CH2," and "CH3") are output voltages on the switching legs of phase 1, 2, and 3. Channel 4 ("CH4") is the current at the output of the switching leg for phase 1. Measurements were performed for normalized φ=30°. The resonant frequency $f_o$ of this inverter is designed to be 146 kHz.

Figure 15:
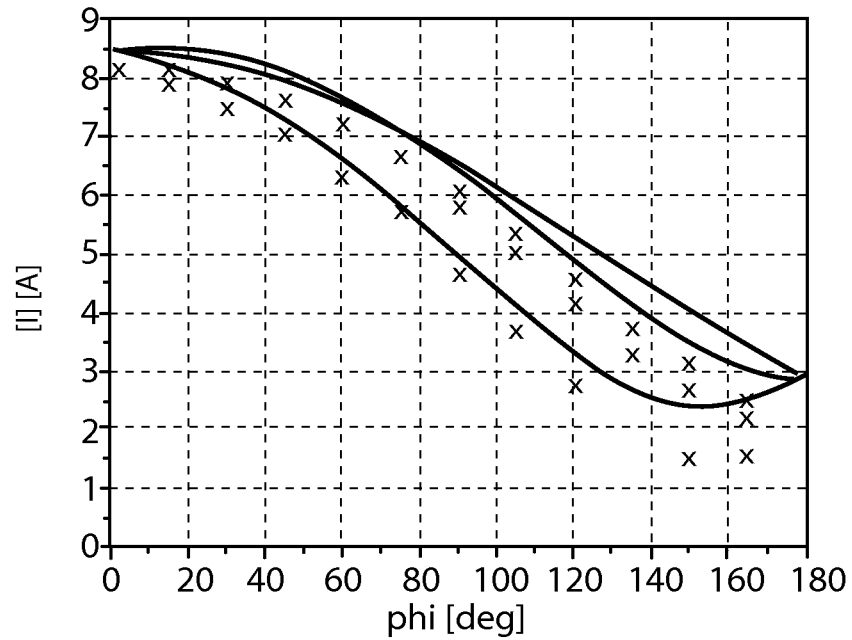
FIG. 15 shows a comparison of current magnitude between experimental results and theoretical analysis according to an embodiment of the present disclosure.

FIG. 15 illustrates current magnitude as a function of normalized φ for the first prototype. Solid lines show calculated values, while Xs show corresponding experimental measurements.

Figure 16:
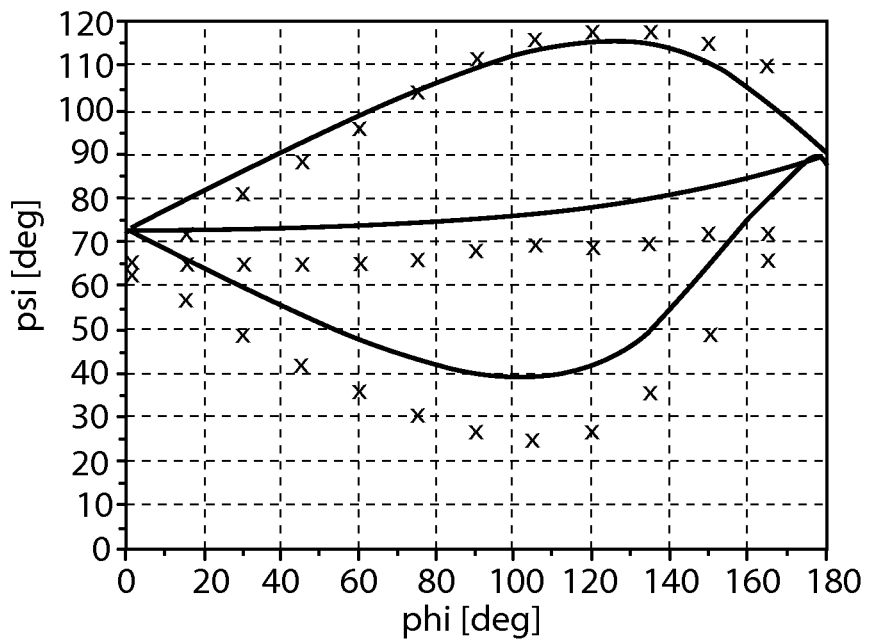
FIG. 16 shows a comparison of principle arguments of the impedance seen by the inverter portion between experimental results and theoretical analysis according to an embodiment of the present disclosure.

FIG. 16 illustrates $\psi_k$ as a function of normalized φ for the first prototype. Solid lines show calculated values, while Xs show corresponding experimental measurements.

Experimental Results of a Second Inverter

For the second inverter prototype, six IPW65R041CFD MOSFET transistors were used. Due to high dV/dt when turning off at high current a 1 nF capacitor was added on the output of each half bridge of the inverter. In the experiments the inverter was loaded with a full bridge voltage driven rectifier with a resistive load. The rectifier was built using four DSEI2X101-06A diodes. Intercell transformers (ICTs) were built using T300-2 cores from Micrometals. As the resonant inductor, an air core winding was used. The resonant capacitor is made by paralleling 57 pieces of 1 nF capacitors rated for 2 kV. On the output of the inverter, a 2 ohms resistor bank was connected, resulting in 1.62 ohms impedance seen by the inverter. A summary of the parameters and component values used to build the prototype are shown in Table III.

TABLE III

| Parameter | Value | Unit |
|---|---|---|
| $f_o$ | 134.4 | kHz |
| $V_I$ | 200 | V |
| $R_L$ | 1.62 | ohm |
| L | 24.6 | µH |
| $L_{mag}$ | 11.7 | µH |
| $L_{leak}$ | 1.64 | µH |
| $C_{oss}$ | 1500 | pF |
| C | 57 | nF |
| $ESR_C$ | 5 | mohm |
| $r_{dson}$ | 82 | mohm |
| $r_{ict}$ | 26.2 | mohm |
| $r_L$ | 36 | mohm |

Figure 17:
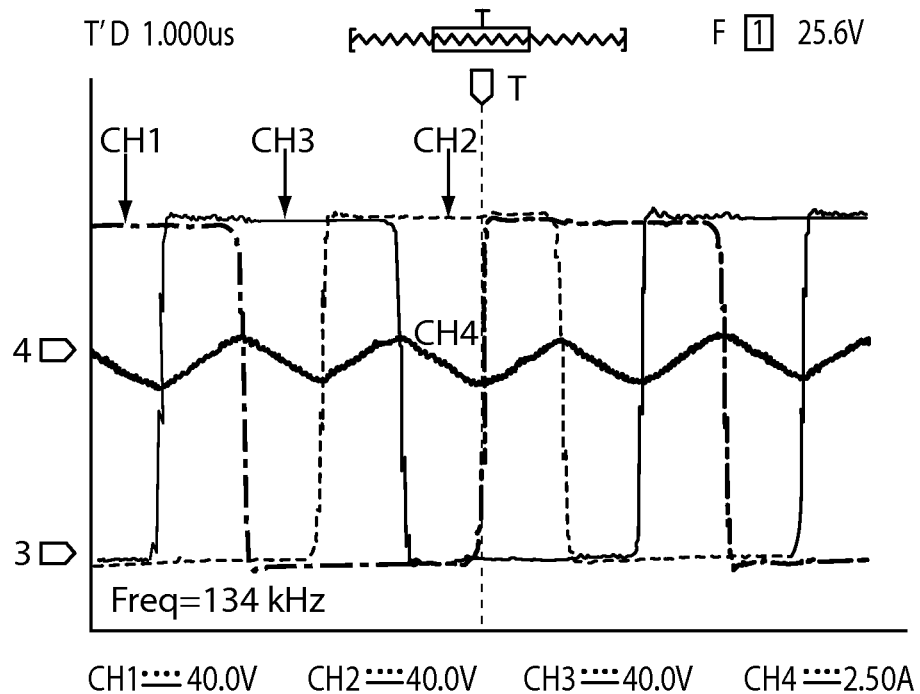
FIG. 17 shows measured waveforms of phase voltages and output current of a resonant inverter for output power below 1 W according to an embodiment of the present disclosure.

FIG. 17 illustrates measured waveforms of phase voltage and output current for an extremely low output power such as, below 1 W. Channels 1, 2, and 3 ("CH1," "CH2," and "CH3") represent measured phase voltages at switching legs 1, 2, and 3. Channel 4 ("CH4") represents resonant circuit current. One can see that even operated at such low power, current output is very close to sinusoidal. The resonant frequency $f_o$ of this inverter is designed to be 134.4 kHz.

Figure 18:
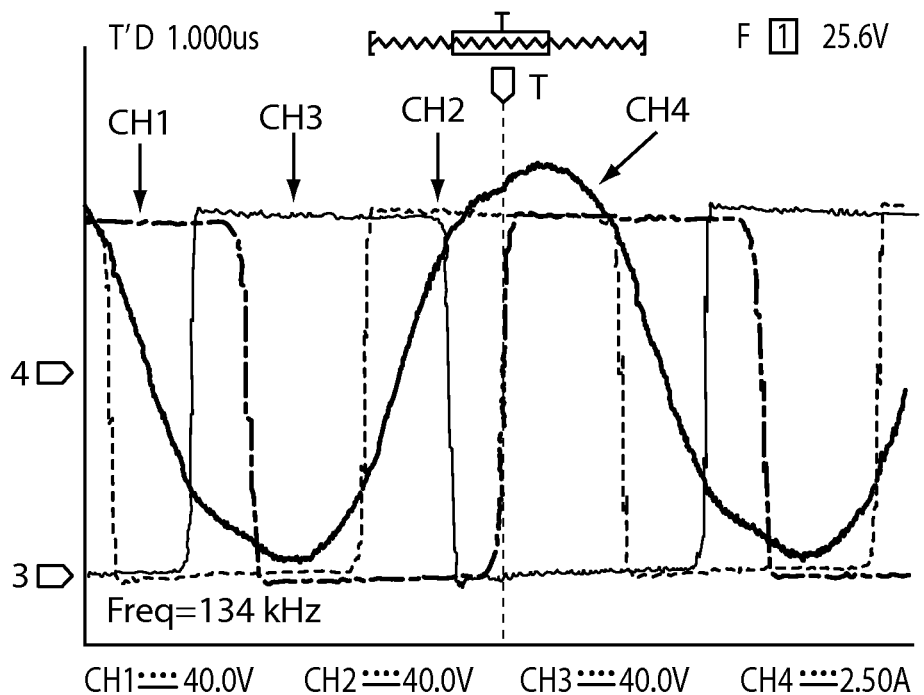
FIG. 18 shows measured waveforms of phase voltages and output current of a resonant inverter for output power of about 50 W according to an embodiment of the present disclosure.

FIG. 18 illustrates measured waveforms of phase voltage and output current for low output power such as, around 1.5% of maximum power. Again, channels 1, 2, and 3 represent measured phase voltages at switching legs 1, 2, and 3. Channel 4 represents the resonant circuit current. Again, current output is very close to sinusoidal.

Figure 19:
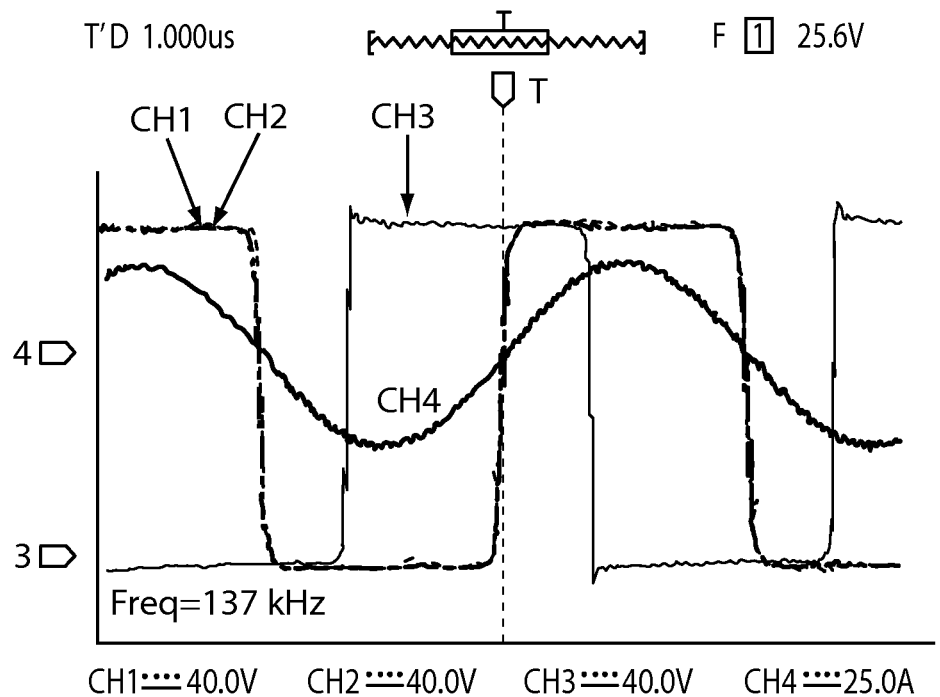
FIG. 19 shows measured waveforms of phase voltages and output current of a resonant inverter for output power of about 1 kW according to an embodiment of the present disclosure.
Figure 20:
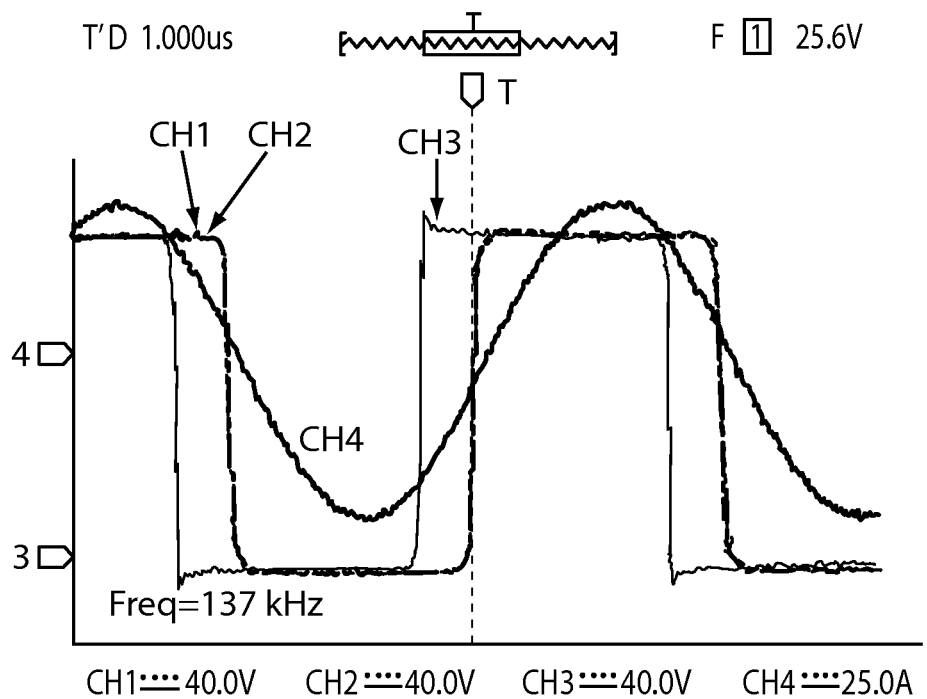
FIG. 20 shows measured waveforms of phase voltages and output current of a resonant inverter for output power of about 3 kW according to an embodiment of the present disclosure.

FIGS. 19 and 20 illustrate measured waveforms of phase voltage and output current for power at 1 kW and 3 kW, respectively. At these power levels, resonant circuit current is sinusoidal. One can see that two phases, such as channels 1 and 2, are in phase and regulation is done by the third phase. It is preferable that operating frequency does not change much while regulating. One can also see that voltage waveform slopes are smooth and there are no oscillations after switching which means all phases are working at ZVS conditions regardless of output power level.

Figure 21:
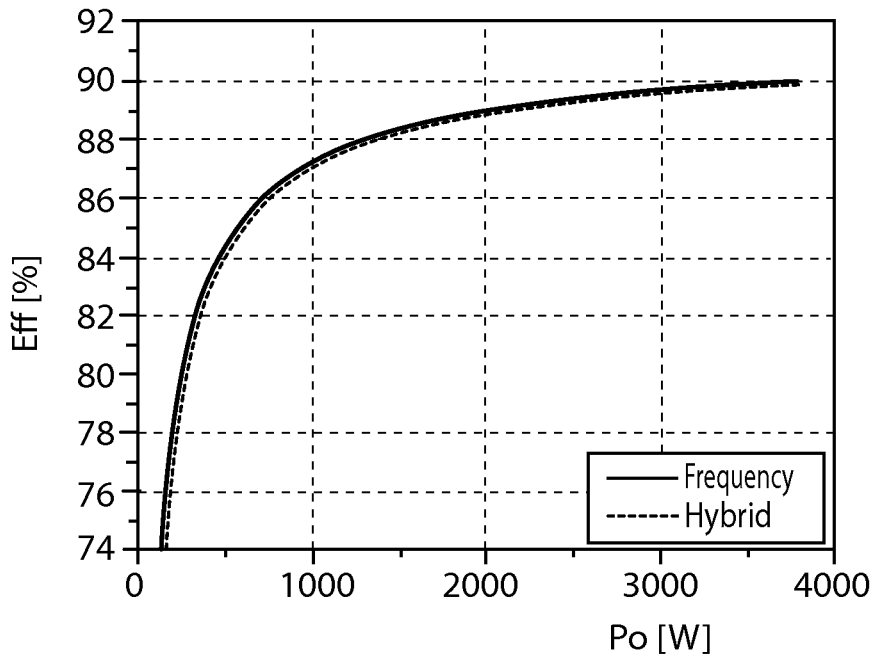
FIG. 21 shows a comparison of inverter efficiency between two control strategies according to an embodiment of the present disclosure.
Figure 22:
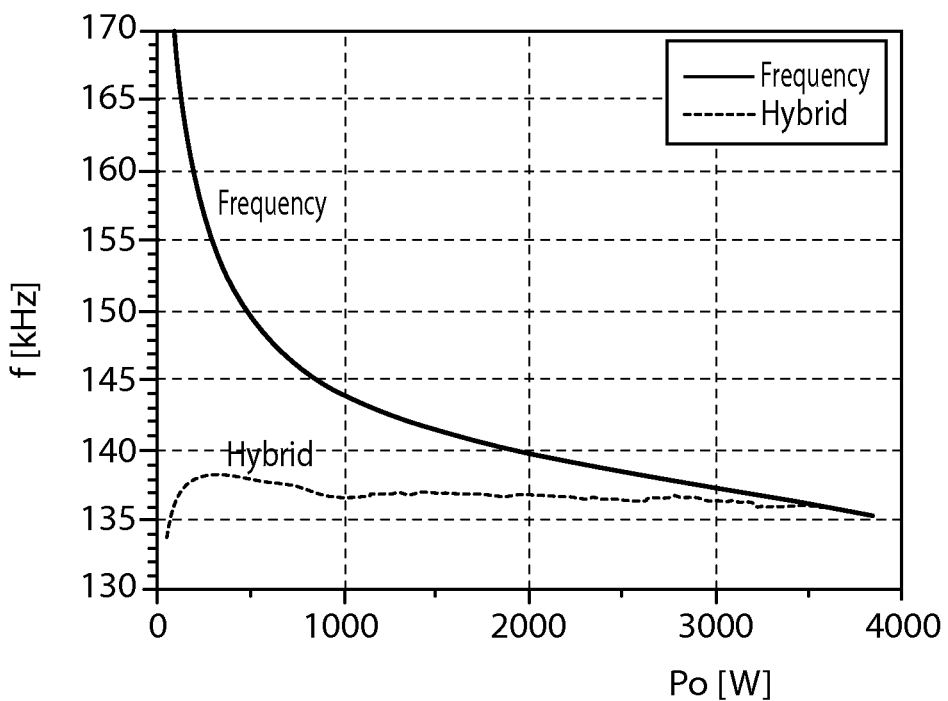
FIG. 22 shows a comparison of operating frequency between two control strategies according to an embodiment of the present disclosure.
Figure 23:
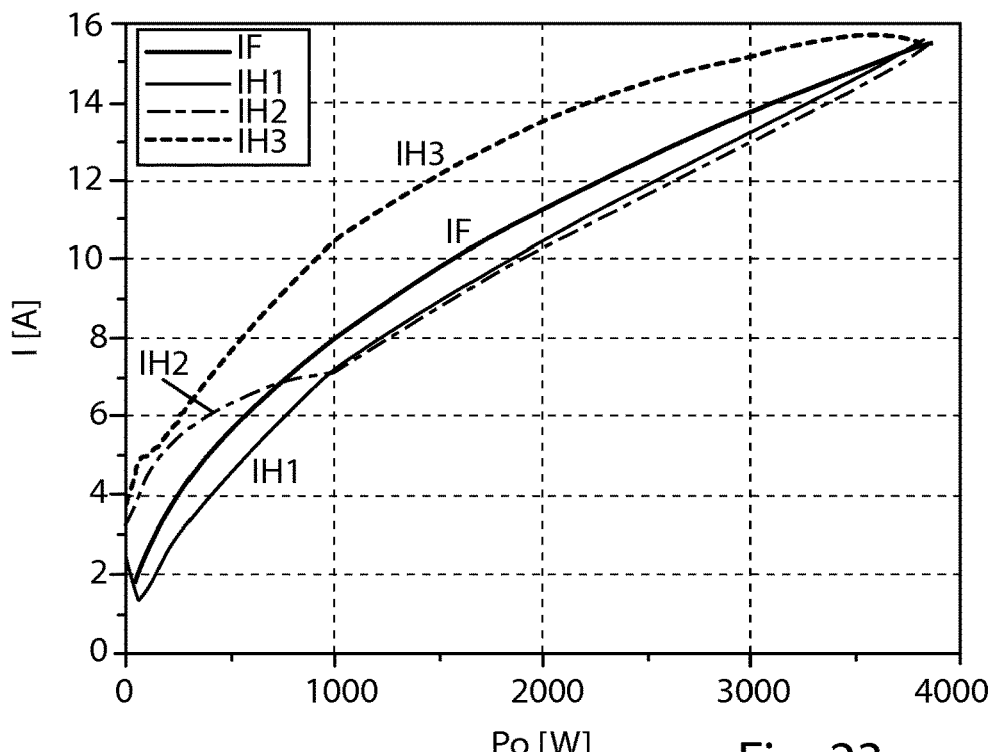
FIG. 23 shows a comparison of inverter phase currents among various control strategies according to an embodiment of the present disclosure.

FIGS. 21, 22, and 23 represent a comparison between frequency control and hybrid control strategies. Efficiency for these two variants is shown in FIG. 21. One can see that, for both frequency control and the hybrid control, there is almost identical efficiency—the difference is within measurement error.

FIG. 22 shows the inverter operating frequencies for the compared two cases. It illustrates clearly that hybrid control allows the operating frequency to be close to the resonant frequency over the whole regulation range. The hybrid control also does not have those limitations which occur in frequency control and are related to low power operation. The hybrid control methods regulate from no power to full load opposite to frequency control which requires very high frequencies at low power.

FIG. 23 presents phase currents of the inverter. For the case of the frequency control method, all phase currents are equal (see IF in FIG. 23). For the case of a hybrid control method, these currents are different from each other (see, IH1, IH2, and IH3 in FIG. 23). As one can see, in this case, one phase, almost all the time, has significantly higher current than the other two phases (See IH3 in FIG. 23).

Figure 24:
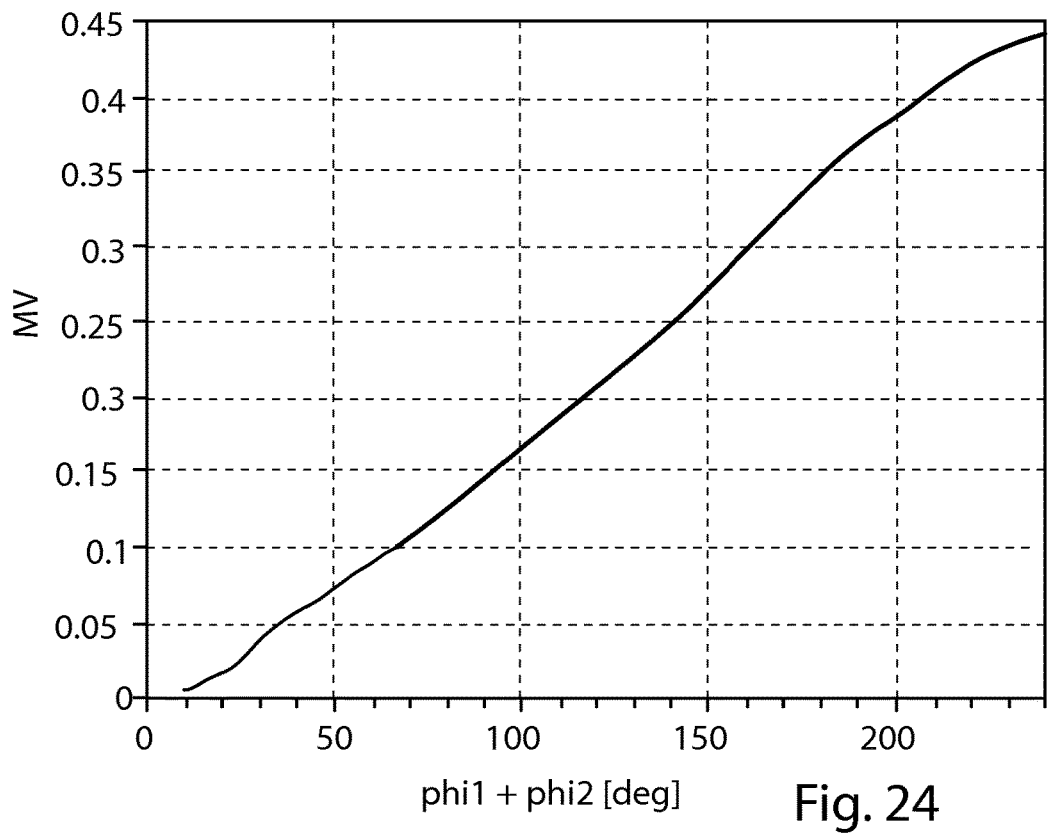
FIG. 24 shows a comparison of voltage transfer function among various control strategies according to an embodiment of the present disclosure.

FIG. 24 illustrates the voltage transfer function of the inverter with the hybrid control strategy. It shows clearly that this transfer function is very close to linear over the whole regulation range. Such a characteristic makes the design of the feedback loop and control algorithms more straight forward and intuitive, especially for a wide operation range.

Experimental Results of a Third Inverter

A 10 kW experimental prototype of a proposed inverter was built and tested. A summary of the parameters and component values of the prototype is presented in Table IV. $L_m$ and $L_l$ are magnetizing and leakage inductance of the intercell transformer respectively. K is the coupling factor between the primary and secondary coils and D is the distance between those coils. Both coils are identical and tuned with series resonant capacitors to the resonant frequency $f_o$. They are coreless and have the dimensions of 60 by 90 cm. $N_1$ and $N_2$ are the number of turns of the impedance. In the result, the wireless power link sees two times lower impedance.

TABLE IV

| Parameter | Value | Unit |
|---|---|---|
| $f_o$ | 82 | kHz |
| $V_I$ | 400 | V |
| L | 30 | µH |
| K | 0.2 | — |
| $N_I$ | 22 | — |
| C | 125 | nF |
| $L_m$ | 20 | µH |

TABLE IV-continued

| Parameter | Value | Unit |
| --- | --- | --- |
| $L_f$ | 1.5 | µH |
| D | 20 | cm |
| $N_2$ | 9 | cm |

Six IPW65R041CFD MOSFETs were used for the inverter prototype. 1 nF capacitors were added at the output of each switching leg of the inverter to alleviate high dV/dt at turnoff. The inverter with wireless power link was loaded with a Class D full-bridge current-driven rectifier with resistive load. The rectifier was built using four DSEI2X101-06A diodes. The intercell transformers (ICTs) were built using 0077101A7 cores from Magnetics. The resonant capacitor was constructed by paralleling 125 pieces of 1 nF capacitors rated for 2 kV. The inverter was tested with a resistive load. Three values of load resistance were used: 12 ohms, 16 ohms, and 20 ohms. The resonant frequency $f_o$ of this inverter is designed to be 82 kHz.

Figure 26:
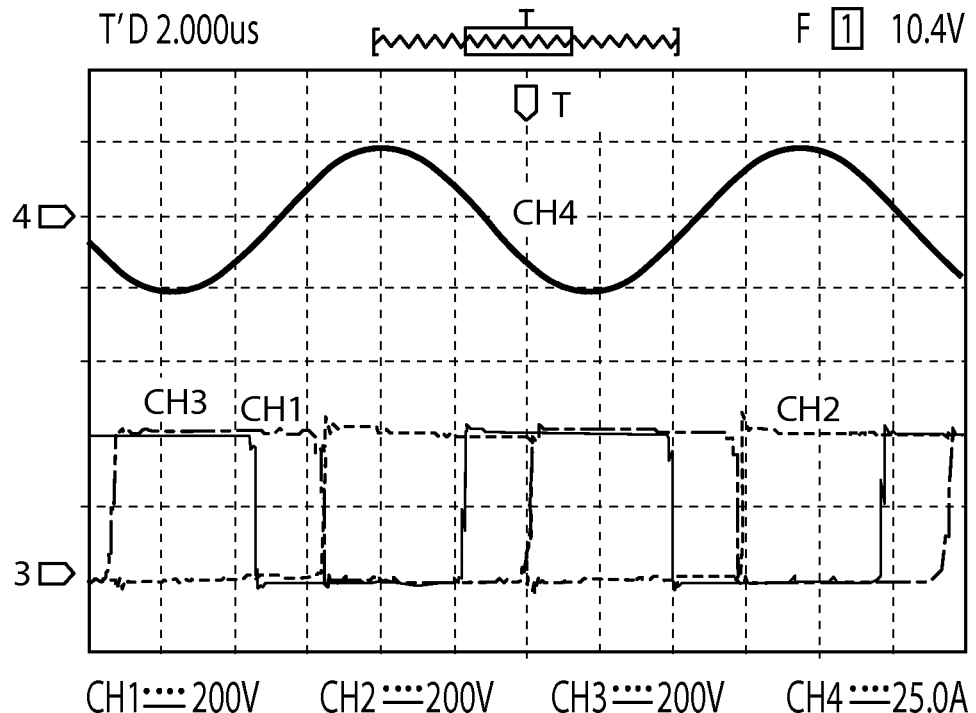
FIG. 26 shows measured waveforms of phase voltages and output current of a resonant inverter for output power of about 1 kW according to an embodiment of the present disclosure.
Figure 27:
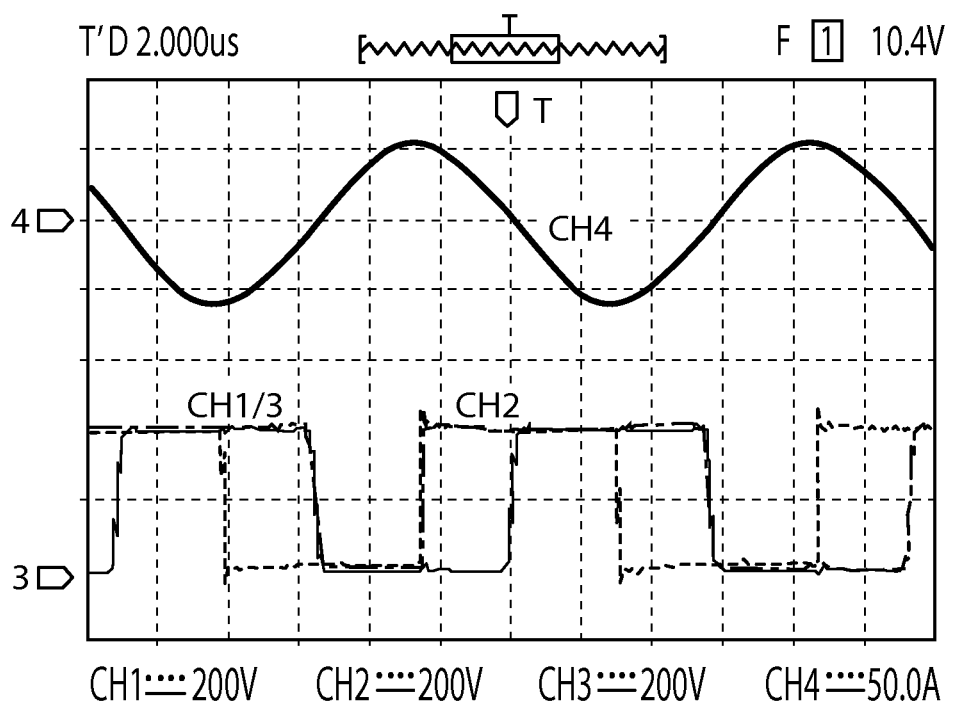
FIG. 27 shows measured waveforms of phase voltages and output current of a resonant inverter for output power of about 5 kW according to an embodiment of the present disclosure.
Figure 28:
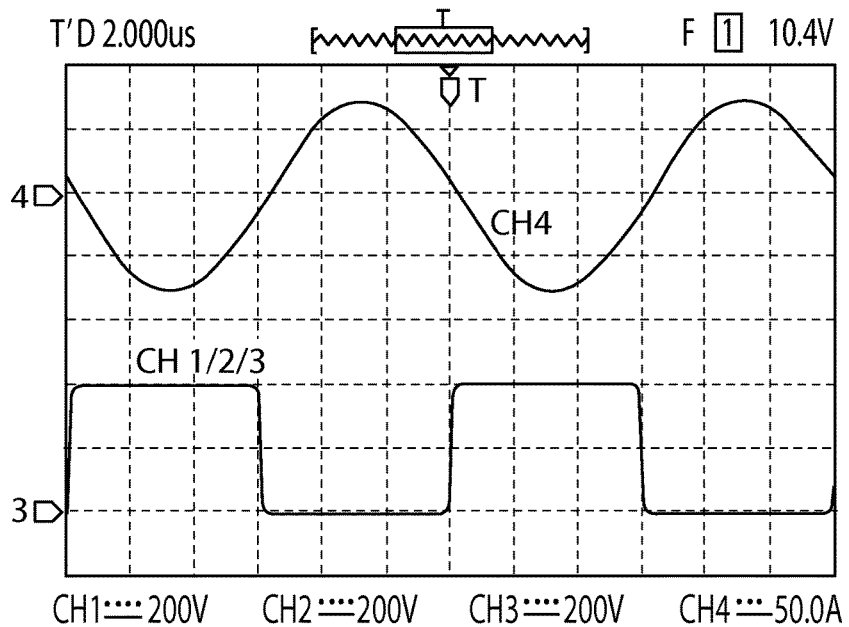
FIG. 28 shows measured waveforms of phase voltages and output current of a resonant inverter for output power of about 9 kW according to an embodiment of the present disclosure.

Two control strategies are implemented for the experimental comparison. The first one is the frequency control. The second one is the phase-frequency hybrid control. The obtained experimental results are presented in FIGS. 26-30. FIG. 26 shows the operation at 1 kW of output power. At this power level, the phase shift between two phases is fixed to 120° and regulation is done by the third phase. It is noted that operation frequency is about 87.7 kHz, which has not changed much as compared with $f_o$. FIG. 26 also shows that the voltage waveform slopes are smooth and no oscillation after switching is observed, which means that all phases are working at ZVS conditions. FIG. 27 shows waveforms for a medium output power of 5 kW. Two phases, Channels 1 and 3 (CH1/3), are in phase and regulation is performed by the third channel (CH2). FIG. 28 shows waveforms at the maximum output power of 9 kW. Channels 1, 2, and 3 are in phase with each other.

Figure 29:
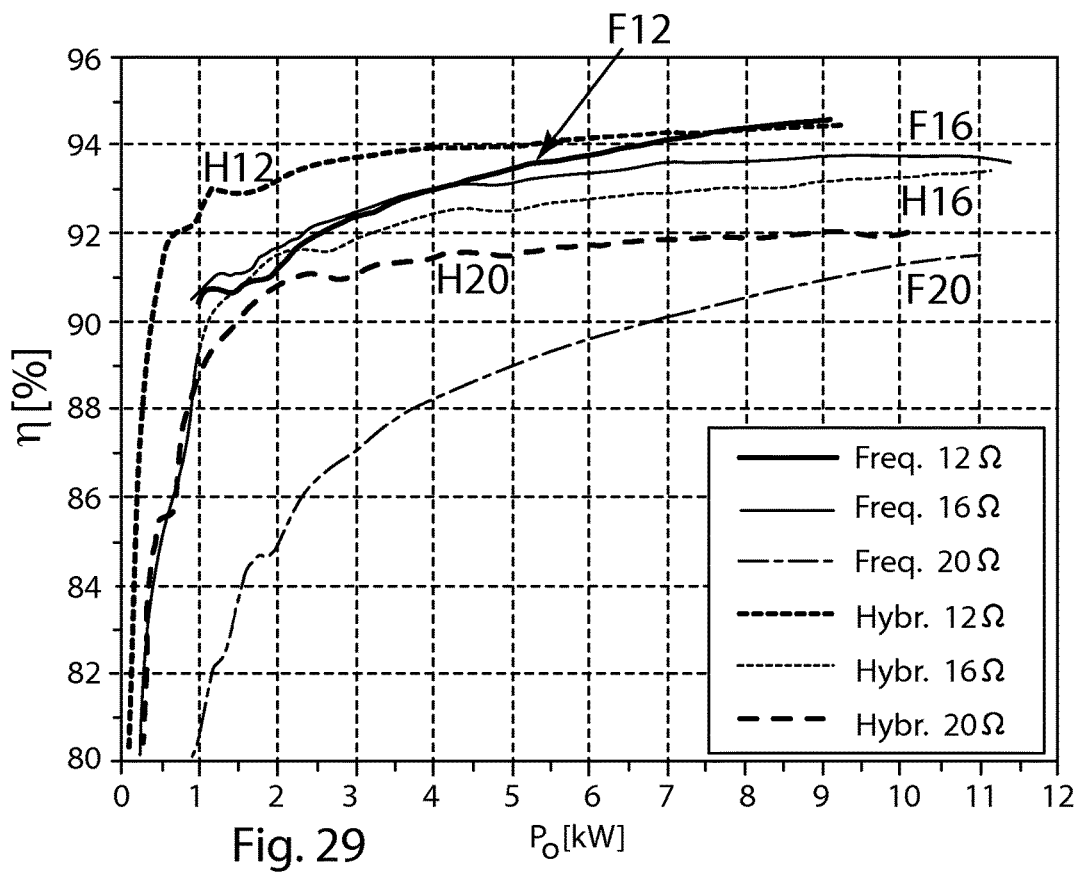
FIG. 29 shows a comparison of efficiency of a resonant inverter between a frequency control method and a hybrid control method for various loads according to an embodiment of the present disclosure.
Figure 30:
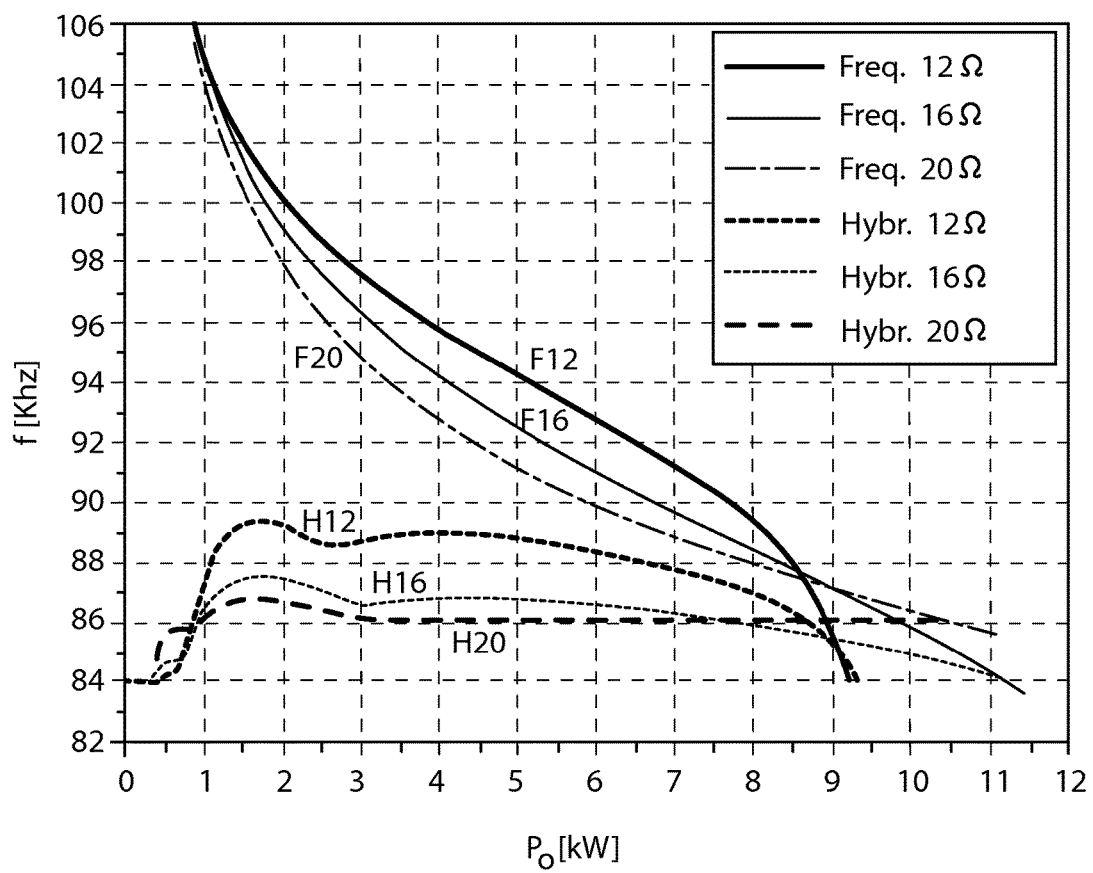
FIG. 30 shows a comparison of operating frequencies of a resonant inverter between a frequency control method and a hybrid control method for various loads according to an embodiment of the present disclosure.

FIG. 29 compares the DC-DC system efficiency for the two types of control methods under various loads. The vertical axis represents the efficiency, while the horizontal axis represents the output power. F12, F16, and F20 refer to frequency control methods at a load of 12, 16, and 20 ohms, respectively. H12, H16, and H20 refer to hybrid control methods at a load of 12, 16, and 20 ohms, respectively. FIG. 30 compares the operation frequency for the two types of control method under various loads. The operation frequency of the hybrid control method fluctuates within a limited range in the whole regulation range. For example, the operating frequency ranges from about 84 kHz at 0.1 kW to about 89 kHz at 1.5 kW. When the output power is about 10 kW, the operating frequency is about 86 kHz. Compared with the resonant frequency of about 82 KHz, the variation is about 2.5 to 8.5 percent of the resonant frequency. On the other hand, frequency control requires a much higher operation frequency at a low power output than hybrid control. For example, at 1 kW output power, the operating frequency of the frequency control method is about 105 kHz, while it is only 86 kHz for the hybrid control method.

The topology and hybrid control method as set forth in the present disclosure demonstrate advantages over traditional frequency controlled inverters. Firstly, the hybrid control methods exhibit full range regulation from zero to full power without losing ZVS conditions. Secondly, they keep the operating frequency range very narrow. And thirdly, the voltage transfer function of the inverter is very close to linear, which helps to design the controller especially for a wide operation range. They also provide all these advantages without efficiency degradation. Moreover, the phase control trajectory can be further optimized to increase inverter performance, especially efficiency. The topology and hybrid control method also allow the use of many smaller but faster switches, which can be operated at high power with high frequency.

Certain variations of the topology and control methods are within the spirit of the present disclosure. For example, the resonant capacitance distribution may be varied. In that case each switching leg has a separate resonant capacitor in series with the intercell transformers. Then, each capacitor has a value of 1/N of a single resonant capacitor of the present topology. This may help to reduce the stresses of resonant capacitors and eliminate a possible DC component of the current flowing between switching legs. Other topology variations may include the application of series-parallel types of resonant circuits.

Wireless Charger

The multiple phase resonant inverter as set forth in the present disclosure is capable of being implemented in a wireless charger for an electric vehicle. The SAE standard SAE J2954 has established tentative requirements for wireless charging of electric and plug-in hybrid vehicles, the entirety of which are incorporated herein by reference. For example, the frequency range of such a charging system is to be from 81.38 kHz to 90.00 kHz. Other parameters that need to be considered during the design of a wireless charging system for an electric vehicle include distance between the charging and vehicle coils (min./max.), misalignment (maximum at which system should work), minimum efficiency, and safety issues. Generally speaking, the operating frequency requirement, the variation of distance and misalignment represent the major factors that determine the transfer function of a charging device. An inverter may need to adjust its output voltage according to these parameters to maintain a proper charging voltage and current for an energy storage device such as a battery. For example, if the distance between coils is increased, the AC voltage magnitude delivered by an inverter needs to be increased correspondingly so that the same output power is maintained. The output power may need to be adjusted from 1.5 kW for small vehicles to 120 kW for a fast charging station such as, for instance, those stations proposed by Telsa Motors Company.

Figure 25:
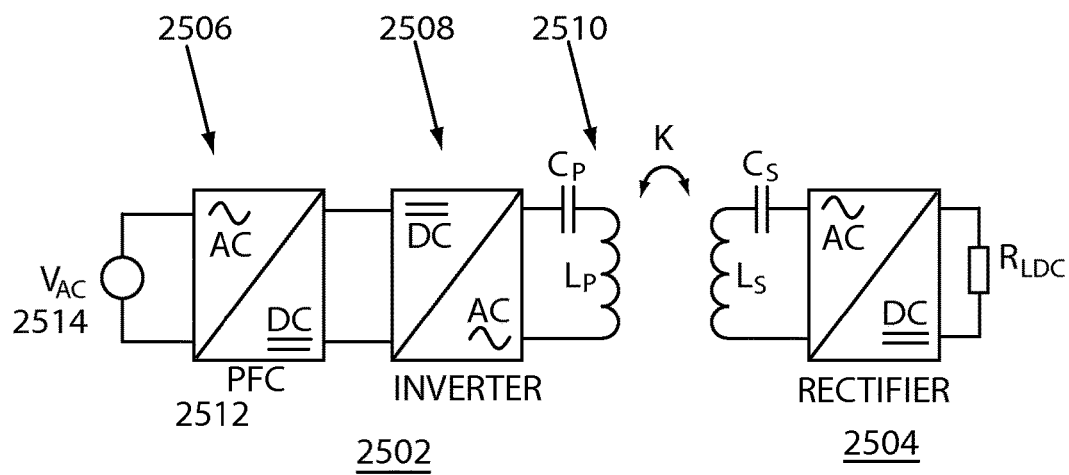
FIG. 25 shows a charging system having a wireless power transmitter and a wireless power receiver according to an embodiment of the present disclosure.

FIG. 25 shows a charging system having a wireless power transmitter (charger) and a wireless power receiver (vehicle) according to an embodiment of the present disclosure. The wireless power transmitter 2502 represents a wireless charger that may be installed at a dedicated charging station, in the ground of a parking lot, or even along the roadside. The wireless power receiver 2504 is typically carried by the electric vehicle. To charge a battery connected to the receiver 2504, the transmitter 2502 and the receiver 2504 need to be in proximity to each other. For example, the distance between the transmitter 2502 and the receiver 2504 may be about a few centimeters, 10-30 centimeters, or 50 centimeters. Either the transmitter 2502 or the receiver 2504 or both may be configured to be movable to various positions. For example, if the transmitter 2502 is installed in the ground of a parking lot, it may be raised up by an actuator to be close to the receiver 2504 installed in a passenger vehicle. Alternatively, the receiver 2504 may be lowered by a similar actuator to bring the receiver and the transmitter within a charging distance.

The transmitter 2502 includes a power portion 2506 that has a power source 2514 and a converter 2512, an inverter portion 2508, and a resonant portion 2510. The resonant portion 2510 is configured to transmit power via magnetic inductance and has a resonant frequency designed to be a predetermined value or range of values, such as required in the SAE J2954 standard. The power portion 2506 provides a DC input to the inverter 2508 which inverts the DC input to an AC output to the resonant portion 2510. The inverter takes DC voltage on the input side and converts it into AC voltage of desired frequency and magnitude. This AC voltage is applied to the primary side of the wireless power link formed by an inductor $L_P$ and a capacitor $C_P$ connected in series. In general, the AC current flowing through the inductor $L_P$ generates the AC magnetic field which induces the current in the coil $L_S$. The coils $L_S$ and capacitor $C_S$ are connected in series and create the secondary side of the wireless power link. The primary side coil $L_P$ and secondary side coil $L_S$ are coupled with each other with coupling factor K. The value of the coupling factor depends on the coil design, size, distance between coils, and misalignment. The AC current induced in the secondary side of the wireless power link is applied to a rectifier, which rectifies the AC current and delivers DC current to the load $R_{LDC}$. The load $R_{LDC}$ represents any type of DC load, in particular the battery which is charged. The inverter portion 2508 and the resonant portion 2510 may be configured according to the resonant inverter as set forth in the present disclosure.

Both DC and AC power sources may be used. When DC power such as a DC grid or battery is used, the power portion 2506 represents the battery or the grid. When AC power such as a commercial AC grid 2514 is used, the power portion 2506 uses the converter 2512 to convert the AC power to DC power following the predetermined requirements of the inverter 2508. For example, Power Factor Corrector (PFC) may be used to convert 50/60 Hz input AC voltage (single or three phase) into a DC voltage.

In addition to the arrangement shown in FIG. 25, both the transmitter 2502 and the receiver 2504 may further include a battery management system (BMS) for managing the operation of an energy storage device, such as a battery. They may further include a communication system, such as Bluetooth or Zigbee, for transmitting charging related information to each other. The battery management system may provide charging voltage, current, history, and other characteristic information to the communication system, which transmits the information to the transmitter or receiver.

Operation of Wirelessly Charging a Vehicle

The charging process starts when the controller of the vehicle, such as BMS, detects the charge level of an energy storage device. If the energy storage device is fully charged or charged above a predetermined level, the controller determines that no charging is required. If the energy storage device's charge level is lower than the predetermined level, the controller determines that it may be charged or is required to be charged. The controller provides a signal to a driver indicating the charge level or whether the energy storage device needs to be charged.

When the vehicle approaches a charging station, the control system of the charging station communicates with the vehicle and obtains information from the vehicle's positioning system and battery management system. Then, it is determined that:

The vehicle is parked accurately according to information from the positioning system.

Wireless communication is established between inverter (charging station) and rectifier (vehicle), and If the vehicle is parked properly and there are no foreign or living objects detected, the control systems enable the power conversion subsystem to proceed with charging.

Then, the charging current is ramped up to a desired value; and the charging process follows the specific charging characteristics, which depend on the battery type. The charging characteristics of an energy storage device are well-known to a person of ordinary skill in the art and will not be described in detail in the present disclosure. Depending on the charging characteristics, the output voltage and current of the charging system are adjusted by using a frequency control method, a phase control method, or a hybrid control method.

When either the control system of the vehicle or the charging station detects a significant change in vehicle position or the presence of foreign or living objects, the charging process is interrupted or terminated. During the actual charging process, the vehicle may send the following data to the inverter:

Battery voltage (or output voltage of the energy storage device)

Battery current (or output current of the energy storage device)

Information about any faults on the vehicle side (e.g. overheating)

Information from BMS (if applicable), such as information about maximum charging current and voltage currently allowed by the energy storage device such as a battery.

REFERENCES

[1] M. K. Kazimierczuk and D. Czarkowski, Resonant Power Converters, 2nd ed., Ch. 11, Wiley Interscience, 2011

[2] D. Czarkowski and M. K. Kazimierczuk, "Single-capacitor phase-controlled series resonant converter," IEEE Trans. Circuits Syst., vol. CAS-40, pp. 381-391, June 1993.

[3] D. Czarkowski and M. K. Kazimierczuk, "Phase-controlled series-parallel resonant converter," IEEE Trans. Power Electronics, vol. PE-8, pp. 309-319, July 1993.

[4] S. Zheng and D. Czarkowski, "Modeling and Digital Control of a Phase-Controlled Series-Parallel Resonant Converter," IEEE Trans. Industrial Electronics, vol. 54, pp. 707-715, April 2007.

[5] C. Braas, F. J. Azcondo, R. Casanueva, "A Generalized Study of Multiphase Parallel Resonant Inverters for High-Power Applications," Circuits and Systems I: Regular Papers, IEEE Transactions on, vol. 55, no. 7, pp. 2128, 2138, August 2008.

[6] J. Jacobs, A. Averberg, and R. De Doncker, "Multi-phase series resonant dc-to-dc converters: Stationary investigations," Power Electronics Specialists Conference, 2005. PESC '05. IEEE 36th, pp. 660666, 2005.

[7] Taotao Jin, K. Smedley, "Multiphase LLC Series Resonant Converter for Microprocessor Voltage Regulation," Industry Applications Conference, 2006. 41st IAS Annual Meeting. Conference Record of the 2006 IEEE, vol. 5, no., pp. 2136, 2143, 8-12 Oct. 2006.

[8] Taufik, J. J. Mullins, "Parallel Operation of Hybrid Loaded Resonant Converter Using Phase-Shift Control," Industrial Electronics, 2006 IEEE International Symposium on, vol. 2, no., pp. 988, 992, 9-13 Jul. 2006.

[9] Bong-Chul Kim, Ki-Bum Park, Gun-Woo Moon, "Analysis and design of two-phase interleaved LLC resonant converter considering load sharing," Energy Conversion Congress and Exposition, 2009. ECCE 2009. IEEE, vol., no., pp. 1141, 1144, 20-24 Sep. 2009.
[10] E. Orietti, P. Mattavelli, G. Spiazzi, C. Adragna, G. Gattavari, "Analysis of multi-phase LLC resonant converters," Power Electronics Conference, 2009. COBEP '09. Brazilian, vol., no., pp. 464, 471, Sep. 27, 2009-Oct. 1, 2009.
[11] Z. J. Zhang, H. M. Li, Y. L. Peng, Y. B. Li, "Phase shift control for multiphase parallel LLC voltage-fed inverter," Electronics Letters, vol. 46, no. 6, pp. 442, 444, Mar. 18 2010.
[12] H. Figge, T. Grote, N. Froehleke, J. Boecker, P. Ide, "Paralleling of LLC resonant converters using frequency controlled current balancing," Power Electronics Specialists Conference, 2008. PESC 2008. IEEE, vol., no., pp. 1080, 1085, 15-19 Jun. 2008.
[13] Guangyong Zhu, B. McDonald, KunrongWang, "Modeling and Analysis of Coupled Inductors in Power Converters," Power Electronics, IEEE Transactions on, vol. 26, no. 5, pp. 1355, 1363, May 2011.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the paragraphs below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention.

What is claimed is:

1. A resonant inverter comprising:
    an inverter portion connected to an intercell transformer portion and a common resonant portion having a load component,
    wherein the intercell transformer portion includes N intercell transformers $ICT_1$ to $ICT_n$, where N is greater than two,
    wherein each intercell transformer includes a primary winding having an input terminal and an output terminal and a secondary winding having an input terminal and an output terminal, and
    wherein the intercell transformer portion is configured such that:
        each intercell transformer directly connects to at least one other intercell transformer,
        intercell transformers $ICT_1$ and $ICT_n$ are connected with each other, and
        one output terminal of each intercell transformer belonging to a group of $ICT_2$ to $ICT_{n-1}$ is connected with the common resonant portion, while a second output terminal of each intercell transformer belonging to the group of $ICT_2$ to $ICT_{n-1}$ is electrically connected with an input terminal of an adjacent transformer.
2. The resonant inverter of claim 1, wherein the intercell transformers are connected with each other in an interweaving manner.
3. The resonant inverter of claim 2, wherein the intercell transformer portion includes three intercell transformers.
4. The resonant inverter of claim 2, wherein each intercell transformer directly connects with at least two other intercell transformers.
5. The resonant inverter of claim 2, wherein the plurality of intercell transformers are identical to each other.
6. The resonant inverter of claim 1, wherein the resonant portion includes inductor and capacitor components connected in serial, parallel or serial-parallel configurations.
7. The resonant inverter of claim 1, wherein the resonant portion connects with the intercell transformer portion in a serial manner.
8. The resonant inverter of claim 1, wherein the inverter portion includes a plurality of half-bridge inverters or full-bridge inverters.
9. The resonant inverter of claim 8, wherein the plurality of inverters are connected in a parallel manner via the intercell transformer portion.
10. The resonant inverter of claim 1, further comprising a DC power source.
11. The resonant inverter of claim 1, wherein the resonant inverter is capable of being operated at approximately a resonant frequency of the common resonant portion across a range of output power.
12. A method for controlling a resonant inverter that includes an intercell transformer portion having multiple phase shifts, comprising:
    operating the resonant inverter at approximately a resonant frequency of the resonant inverter over a full operation range of the resonant inverter; and
    adjusting phase shifts of the intercell transformer portion to control an output power of the resonant inverter, the intercell transformer portion including N intercell transformers $ICT_1$ to $ICT_n$, where N is greater than two, wherein:
        each intercell transformer directly connects to at least one other intercell transformer,
        intercell transformers $ICT_1$ and $ICT_n$ are connected with each other, and
        one output terminal of each intercell transformer belonging to a group of $ICT_2$ to $ICT_{n-1}$ is connected with the common resonant portion, while a second output terminal of each intercell transformer belonging to the group of $ICT_2$ to $ICT_{n-1}$ is electrically connected with an input terminal of an adjacent transformer.
13. The method of claim 12, wherein adjusting the phase shifts to control the output power of the resonant inverter includes adjusting each phase shift equally.
14. The method of claim 12, wherein adjusting the phase shifts to control the output power of the resonant inverter includes adjusting each phase shift independently of other phase shifts.
15. The method of claim 12, further comprising:
    determining a range of phase shifts based on a voltage transfer function of the resonant inverter.
16. The method of claim 14, further comprising:
    determining a control trajectory of phase shifts that causes a principle argument of the resonant inverter to be greater than zero.
17. A device for wirelessly charging an electric vehicle, comprising:
    a resonant inverter that includes an inverter portion connected to an intercell transformer portion and a common resonant portion having a load component,
    wherein the intercell transformer portion includes intercell N transformers $ICT_1$ to $ICT_n$, where N is greater than two, wherein each intercell transformer includes a primary winding having an input terminal and an output terminal and a secondary winding having an input terminal and an output terminal, and wherein the intercell transformer portion is configured such that:

each intercell transformer directly connects to at least one other intercell transformer, intercell transformers $ICT_1$ and $ICT_n$ are connected with each other, and one output terminal of each intercell transformer belonging to the group of $ICT_2$ to $ICT_{n-1}$ is connected with the common resonant portion, while a second output terminal of each intercell transformer belonging to the group of $ICT_2$ to $ICT_{n-1}$ is electrically connected with an input terminal of an adjacent transformer.

18. The device of claim 17, wherein the intercell transformer portion includes three intercell transformers.

19. The device of claim 17, further comprising a DC power source.

20. The device of claim 17, wherein the resonant inverter is capable of being operated at approximately a resonant frequency of the common resonant portion across a range of output power.

* * * * *